US011274533B2

(12) United States Patent
Harnsberger et al.

(10) Patent No.: US 11,274,533 B2
(45) Date of Patent: Mar. 15, 2022

(54) LINEAR MOTOR FOR PUMPING

(71) Applicant: Moog Inc., East Aurora, NY (US)

(72) Inventors: Gregory M. Harnsberger, West Chester, PA (US); Carl Deirmengian, Media, PA (US); Brian Williams, Norwood, PA (US); David P. Cardamone, Lansdale, PA (US); John C. Layer, East Aurora, NY (US)

(73) Assignee: Moog Inc., East Aurora, NY (US)

( * ) Notice: Subject to any disclaimer, the term of this patent is extended or adjusted under 35 U.S.C. 154(b) by 96 days.

(21) Appl. No.: 15/502,719

(22) PCT Filed: Jul. 31, 2015

(86) PCT No.: PCT/US2015/043186
§ 371 (c)(1),
(2) Date: Feb. 8, 2017

(87) PCT Pub. No.: WO2016/032690
PCT Pub. Date: Mar. 3, 2016

(65) Prior Publication Data

US 2017/0241246 A1 Aug. 24, 2017

Related U.S. Application Data

(60) Provisional application No. 62/043,820, filed on Aug. 29, 2014.

(51) Int. Cl.
*E21B 43/12* (2006.01)
*F04B 47/06* (2006.01)
(Continued)

(52) U.S. Cl.
CPC .......... *E21B 43/128* (2013.01); *E21B 47/008* (2020.05); *F04B 17/03* (2013.01);
(Continued)

(58) Field of Classification Search
CPC ...... H02K 41/031; H02K 5/1285; H02K 5/20; F04B 17/04; F04B 17/042; F04B 19/22; F04B 47/06; E21B 43/128; E21B 43/121
See application file for complete search history.

(56) References Cited

U.S. PATENT DOCUMENTS 1,655,825 A 1/1928 Schmidt
5,049,046 A * 9/1991 Escue .................. E21B 43/128 166/66

(Continued)

OTHER PUBLICATIONS

International Search Report and Written Opinion of the International Searching Authority (11 pages) completed Nov. 19, 2015.

*Primary Examiner* — Devon C Kramer
*Assistant Examiner* — David N Brandt
(74) *Attorney, Agent, or Firm* — Harter Secrest & Emery LLP

(57) ABSTRACT

A linear actuator for pumping comprising a stator having an inner opening, a shaft having a plurality of permanent magnets spaced linearly in the axial direction, the shaft disposed in the stator opening and configured to reciprocate linearly in the axial direction relative to the stator, the stator comprising a first stator assembly having a plurality of pole sections spaced linearly in the axial direction and a plurality of coils disposed therebetween, a second stator assembly having a plurality of pole sections spaced linearly in the axial direction and a plurality of coils disposed therebetween, a bearing assembly positioned axially between the first stator assembly and the second stator assembly, and the bearing assembly having a width that is a function of the spacing of the plurality of pole sections of the first stator assembly and the second assembly and the spacing of the plurality of permanent magnets of the shaft.

25 Claims, 14 Drawing Sheets

(51) Int. Cl.

| | |
|---|---|
| ***F04B 47/04*** | (2006.01) |
| ***F04B 17/03*** | (2006.01) |
| ***F04B 19/22*** | (2006.01) |
| ***H02K 1/14*** | (2006.01) |
| ***H02K 1/34*** | (2006.01) |
| ***H02K 5/132*** | (2006.01) |
| ***H02K 41/03*** | (2006.01) |
| ***E21B 47/008*** | (2012.01) |

(52) U.S. Cl.

CPC .............. *F04B 19/22* (2013.01); *F04B 47/04* (2013.01); *F04B 47/06* (2013.01); *H02K 1/14* (2013.01); *H02K 1/34* (2013.01); *H02K 5/132* (2013.01); *H02K 41/033* (2013.01)

(56) References Cited

U.S. PATENT DOCUMENTS

| | | | | |
|---|---|---|---|---|
| 5,252,043 | A * | 10/1993 | Bolding | E21B 43/128 417/417 |
| 5,620,048 | A | 4/1997 | Beauquin | |
| 5,691,582 | A | 11/1997 | Lucas et al. | |
| 5,734,209 | A | 3/1998 | Halliday | |
| 5,831,353 | A * | 11/1998 | Bolding | F04B 17/046 310/12.15 |
| 6,059,539 | A | 5/2000 | Nyilas et al. | |
| 6,289,575 | B1 | 9/2001 | Hollingsworth et al. | |
| 6,603,224 | B1 | 8/2003 | Hollingsworth et al. | |
| 7,044,215 | B2 | 5/2006 | Boyles | |
| 7,417,343 | B2 | 8/2008 | Lindberg et al. | |
| 7,699,097 | B2 | 4/2010 | Shen et al. | |
| 7,701,106 | B2 * | 4/2010 | Yuratich | E21B 43/128 310/214 |
| 7,880,418 | B2 | 2/2011 | Petit | |
| 7,946,025 | B2 | 5/2011 | Lindberg et al. | |
| 8,016,027 | B2 | 9/2011 | Boyles | |
| 2008/0128128 | A1 * | 6/2008 | Vail | E21B 4/18 166/250.15 |
| 2010/0314957 | A1 | 12/2010 | Wellman | |
| 2011/0123374 | A1 * | 5/2011 | Albers | E21B 43/128 417/414 |
| 2014/0191602 | A1 | 7/2014 | Hardway et al. | |
| 2015/0060043 | A1 * | 3/2015 | Breit | E21B 17/05 166/66.4 |
| 2016/0102535 | A1 * | 4/2016 | Wang | E21B 43/127 417/417 |

* cited by examiner

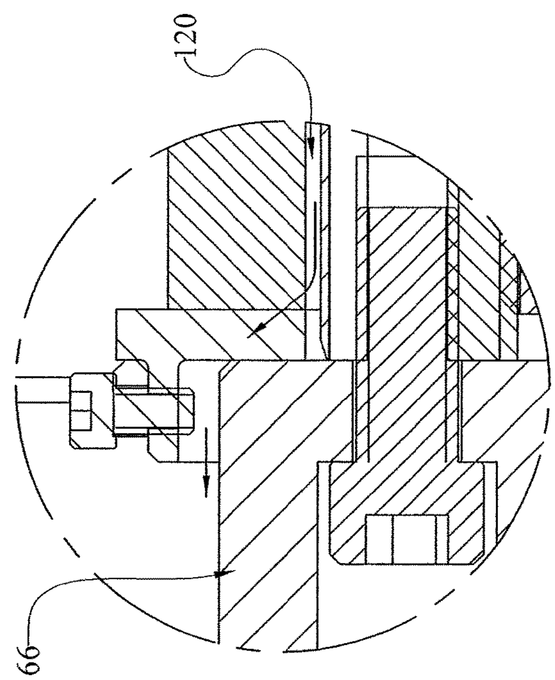
FIG. 15
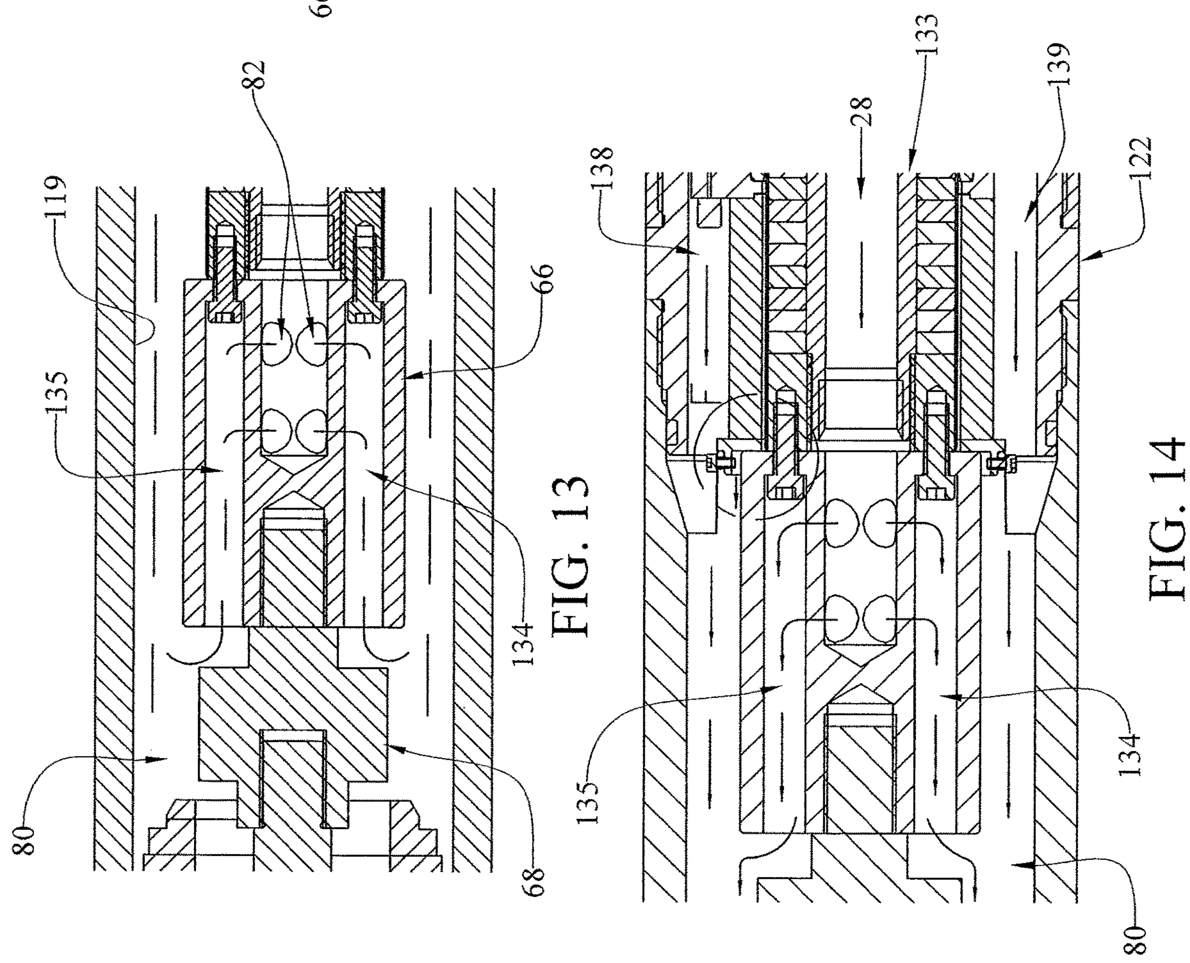
FIG. 13
FIG. 14

121
120
28
23
33
34

128
G
126
32
31
120
42
43
126
128

133
44
118
121
62
32

31
120
42
43
133
126
128

44
118
120
28
34
39
126
62
J
32
K

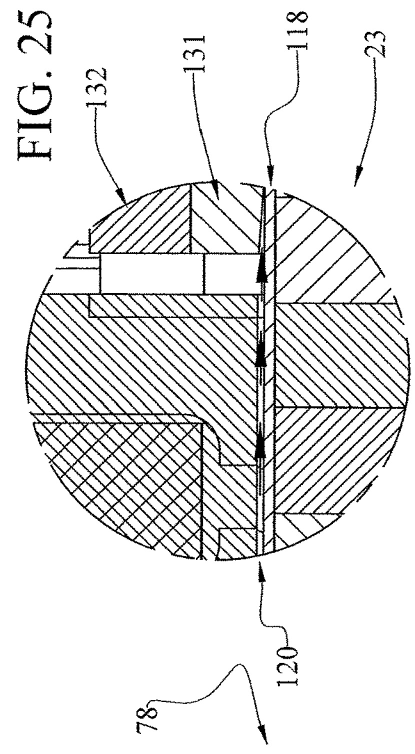
FIG. 25
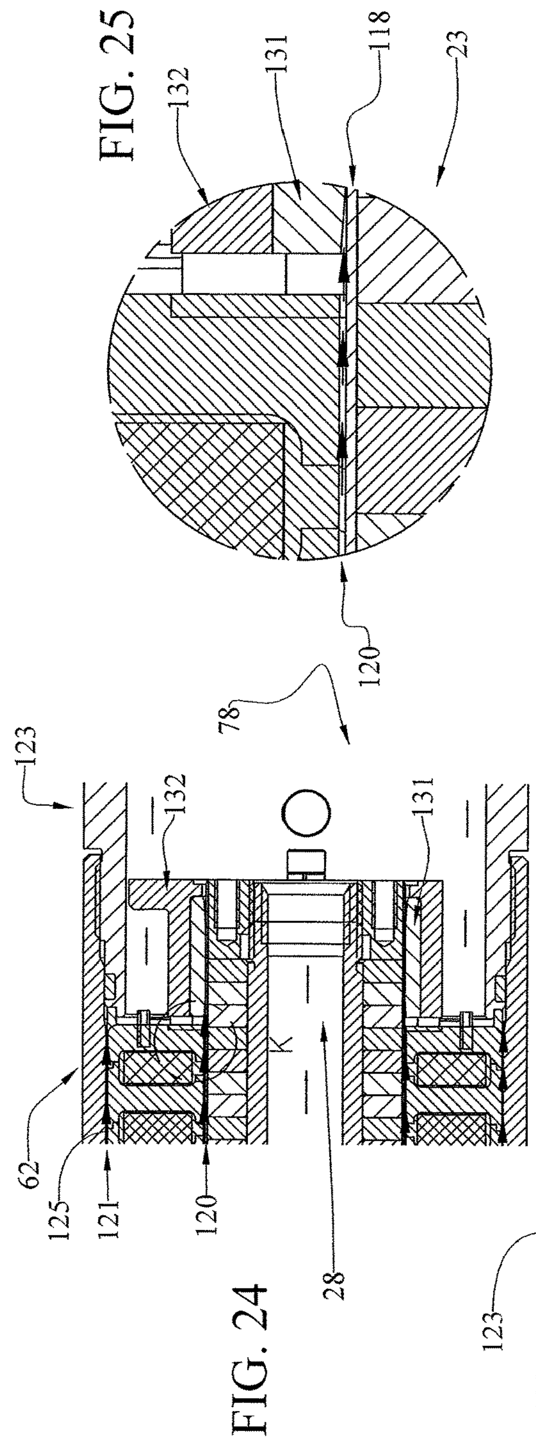
FIG. 24
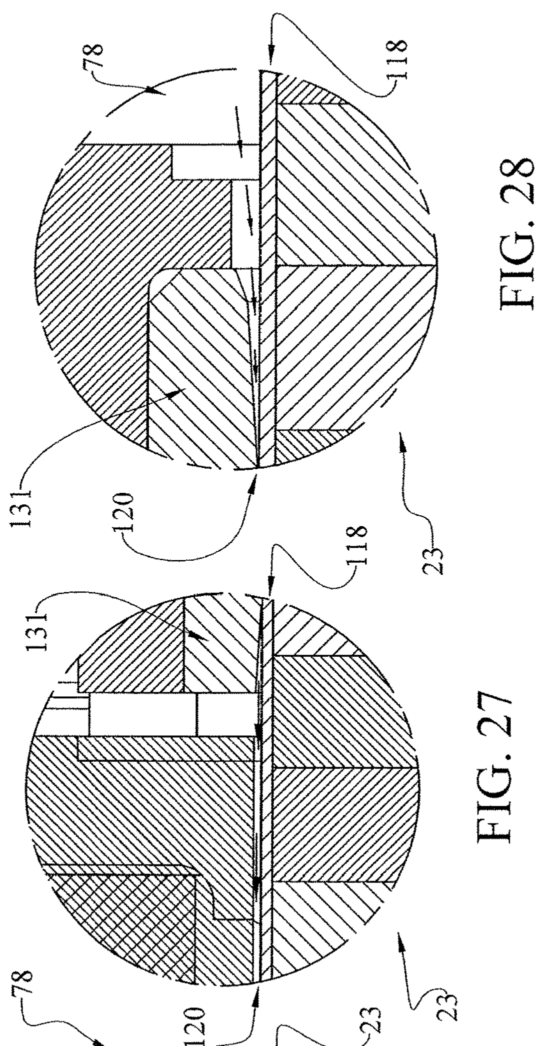
FIG. 28
FIG. 27
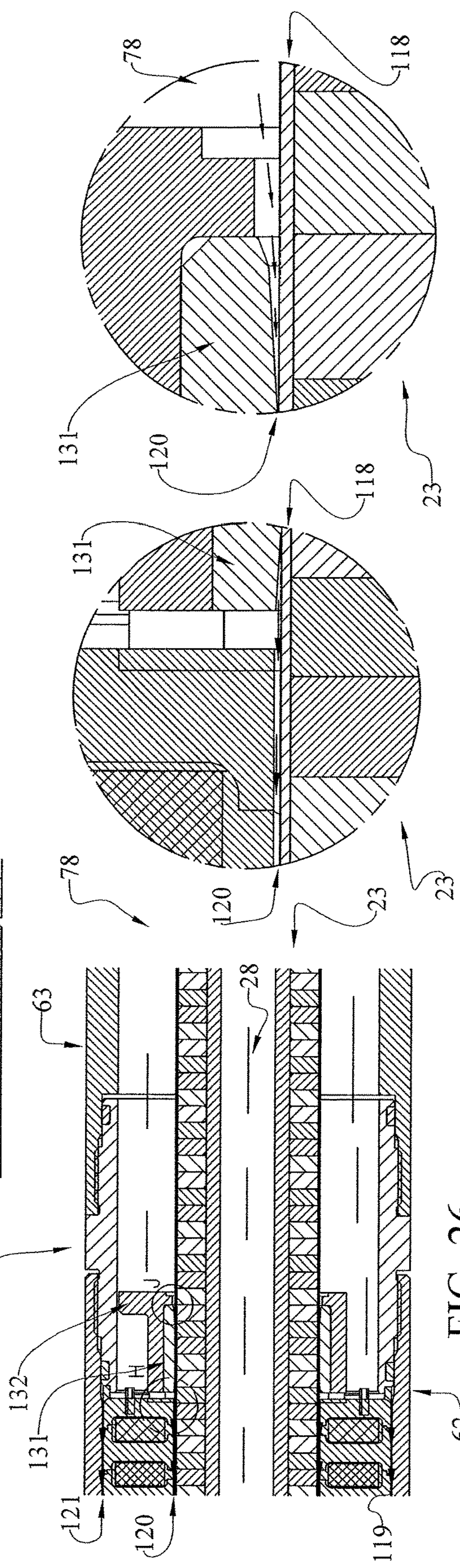
FIG. 26

LINEAR MOTOR FOR PUMPING

TECHNICAL FIELD

The present invention is directed to linear motors, and more particularly linear motors for use with reciprocating down hole pumps.

BACKGROUND ART

Often there is not enough pressure for wells to produce at commercially viable levels without assistance in lifting formation fluids to the surface. Artificial lift devices are therefore used to pump oil or other liquids from underground or subsurface to ground or surface level.

A common approach for moving production fluids to the surface includes the use of a submersible pump. These pumps are installed in the well itself, typically at the lower end of the production tubing. One type of such a submersible pump generally comprises a cylindrical housing and an inner reciprocating piston, which reside at the base of the production line. The pump has an inlet at the bottom end of the piston and an outlet at the top end. The pump forces a first volume of fluid upward within the production tubing during an upstroke and a second volume of fluid upward within the tubing during the pumps downstroke. The piston is reciprocated axially within the well bore by a linear magnetic motor. The linear magnetic motor having a series of windings that act upon an inner shaft is located below the pump. The motor is powered by an electrical cable extending from the surface to the bottom of the well. The power supply generates a magnetic field within the coils of the motor which, in turn, imparts an oscillating force on the shaft of the motor. The shaft thereby is translated in an up and down or linear fashion within the well. The shaft is connected, through a linkage, to the piston of the pump and thus imparts translational or lineal movement to the pump piston. The linear electric motor thus enables the piston of the pump to reciprocate vertically, thereby enabling fluids to be lifted with each stroke of the piston towards the surface of the well.

Linear magnetic motors include a stator assembly and a shaft that is driven to move linearly (that is, as a straight line translation) with respect to the stator assembly. The shaft member is at least partially surrounded by the stator and is held in place relative to the stator assembly by a bearing. The shaft generates a magnetic field by virtue of having a series of built in permanent magnets. The stator generates magnetic fields through a series of annular magnetic coils. By timing the flow of current in the coils with respect to the position and/or momentum of the shaft, the interaction of magnetic forces from the shaft and from the stator will actuate the shaft to move linearly either up or down.

U.S. Pat. No. 5,691,582, which issued Nov. 25, 1997, discloses a linear motor comprising a movable cylindrical armature and a coaxial fixed stator assembly. The linear motor uses both the constant magnetic force generated by a plurality of permanent magnetic rings and the controllable magnetic flux generated through the use of electromagnetic coils to produce motion of the armature relative to the stator. The armature comprises a non-magnetic tubular sleeve which supports a plurality of permanent magnetic rings of ferromagnetic material. U.S. Pat. Nos. 7,417,343 and 7,946,025, are directed to a linear motor shaft, and more particularly to a shaft having a bearing layer to operate between the armature and stator of the linear motor. A sleeve is made from material that has a relatively high magnetic permeability (ratio of magnetic flux density in material to magnetizing force producing it), has significant residual magnetization, and magnetically saturates. U.S. Pat. Nos. 6,603,224 and 6,289,575 are directed to a stator assembly. The stator is formed from two or more individual pieces glued or bolted together, preferably with wire coils interleaved between them. The pieces act as spacers for the wire coils. The wire coils are located in the slots or discontinuities between the pieces. The pieces include an annular ring with a trapezoid cross-section. This complements the trapezoidal cross section of coils, which are pre-wound into disc-like components for ease of assembly. The tubular assembly can be assembled by interleaving the pieces with pre-wound coils, with the shape of the coils being complementary to the cavity formed by the opposed surfaces of the adjacent pieces.

U.S. Pat. No. 1,655,825, which issued Jan. 10, 1928, discloses a linear electromagnetic motor coupled to an oil well pump. Solenoids are mounted within a casing and arranged to actuate a core. The core is made up of a stacked series of magnetizable members interspersed between non-magnetizable members. The core is coupled to a pump plunger. An upper valve and two lower valves allow only upwards flow of fluid. By sequentially applying current to the elevating solenoids, and then the depressing solenoids, the core and pump plunger are caused to reciprocate, which forces fluid to flow upwards through the valves.

Other patents since 1929 disclose various more complex forms of down well electromagnetic linear motor powered pumps. For example, U.S. Pat. No. 5,049,046 teaches a down hole electromagnetic motor-pump assembly having an armature with permanent magnets and a stator with multiple coils, a pump having a reciprocating piston, a down hole switching motor controller, and a remote wireless monitoring station. The patent teaches a motor-pump assembly having a motor-pump cartridge unit that is supported down hole in a sleeve assembly of an oil well and connected to the surface through tubing and a cable. The pump is shown and described as having an outer barrel that contains a piston within. A check valve is arranged below the piston and a second check valve is arranged above the piston. By way of another example, U.S. Pat. No. 5,831,353 discloses a motor-pump assembly having a positive displacement pump and a brushless DC linear motor for driving the pump reciprocatively to allow the fluids in the production tube to be lifted to the upper ground level. A motor controller is provided for controlling the linear motor and supplies the motor with a certain number of direct current pulses. A coupling arrangement connects the pump to the motor. The motor is described as being of modular construction with a plurality of interconnected stator modules or units and at least one modular cylindrically shaped mover. The stator units are described as having a plurality of spaced apart pairs of oppositely wound toroidal coils. The mover is described as having ring shaped, radially polarized permanent magnets stacked on a shaft in alternating polarities interleaved with bearing units, which share the total frictional stress by being spaced between the respective magnets. The pump is described as working much like a sucker rod pump and has a plunger coupled to the motor mover so as to move together in unison. Well fluid is pumped through a bore in the center of motor, thus enabling much of the heat generated by the motor to be dissipated into the well fluid.

DISCLOSURE OF THE INVENTION

With parenthetical reference to the corresponding parts, portions or surfaces of the disclosed embodiment, merely for purposes of illustration and not by way of limitation, provided is an oil well installation (15) comprising tubing (16) arranged in a well (18) and forming a flow channel to a surface level for fluids originating from below the surface level, a pump (19) disposed in the well, a linear actuator (20) disposed in the well and configured to actuate the pump, the linear actuator comprising a stator (21) having an inner opening (22) and a shaft (23) disposed in the opening and configured and arranged to reciprocate linearly in an axial direction (x-x) relative to the stator under the effect of a magnetic field generated by the stator, a cable (24) supplying electric power from the surface level to the stator, a signal cable (24A) communicating motor position and sensor data, the shaft comprising a plurality of permanent magnets (26) spaced linearly in the axial direction and having an inner passage (28) extending axially through at least a portion of the shaft, the stator comprising a first stator assembly (29) comprising a plurality of pole sections (31) spaced linearly in the axial direction and a plurality of coils (32) disposed therebetween, the plurality of pole sections forming a first inner surface (35) of the stator opening of a first diameter (38), a second stator assembly (30) comprising a plurality of pole sections (33) spaced linearly in the axial direction and a plurality of coils (34) disposed therebetween, the plurality of pole sections forming a second inner surface (36) of the stator opening of the first diameter (38), a bearing assembly (39) positioned axially between the first stator assembly and the second stator assembly and forming a third inner surface (42, 43, 44) of the stator opening, at least a portion of which (43) has a second diameter (52) less than the first diameter (38), the bearing assembly having a width (53) that is a function of the spacing of the plurality of pole sections of the first stator assembly and the second stator assembly and the spacing of the plurality of permanent magnets of the shaft, a housing (54) defining a chamber (55) substantially isolated from the well, the stator and the shaft disposed in the chamber, the chamber containing a liquid and the liquid substantially sealed within the chamber, the shaft in the chamber configured and arranged such that the liquid will substantially flow through the inner passage of the shaft with linear movement of the shaft relative to the stator, and a pressure compensator (58) configured and arranged to normalize pressure differences between outside the chamber and inside the chamber.

The housing may comprise a first end portion (59) and the linear actuator may comprise an actuator rod (64) having a portion (65) sealingly penetrating the first end portion of the housing, and the pump may comprise a pump housing (69) connected to the actuator housing and a piston (70) disposed in the pump housing and configured and arranged to reciprocate linearly in the axial direction relative to the pump housing, the piston connected to the portion (65) of the actuator rod sealing penetrating the first end portion of the housing for movement therewith. The pressure compensator may comprise a bladder (71, 72) in the chamber and a pressure port (73) extending through an end cap (60) of the housing and communicating between an interior (76) of the bladder and outside the housing. The housing may comprise a first cylinder portion (61) defining a first sub-chamber (80), a second cylinder portion (62) defining a second sub-chamber (79), and a third cylinder portion (63) defining a third sub-chamber (78), the stator may be disposed in the second sub-chamber and fixed to the second cylinder portion, and the shaft may be configured and arranged to reciprocate linearly in a first axial direction into the first sub-chamber (80) and to reciprocate linearly in a second axial direction into the third sub-chamber (78). The housing may comprise a first end portion (59) at a first distal end of the first cylinder portion (61) and the linear actuator may comprise an actuator rod (64) connected to a first end (66) of the shaft for movement therewith and disposed in the first sub-chamber and having a portion (65) sealingly penetrating the first end portion of the housing, and the pump may comprise a pump housing (69) connected to the first cylinder portion of the actuator housing and a piston (70) disposed in the pump housing and configured and arranged to reciprocate linearly in an axial direction relative to the pump housing, and the piston may be connected to the portion of the actuator rod sealing penetrating the first end portion of the housing for movement therewith. The first end portion may comprise a seal (81). The actuator rod and the first end of the shaft may be connected by an alignment swivel coupling (68). The first end of the shaft may comprise at least one side passage (82, 134, 135) extending through the shaft from the inner axial passage (28) to an outer surface of the shaft. The first stator assembly may comprise a first side surface (84) having an alignment pilot (85, 86), the second stator assembly may comprise a first side surface (88) having an alignment pilot (89, 90), the bearing assembly may comprise a first side surface (46) having an alignment pilot (47, 48) in mating relationship with the alignment pilot (85, 86) of the first side surface of the first stator assembly, and the bearing assembly may comprise a second side surface (40) having an alignment pilot (50, 51) in mating relationship with the alignment pilot (89, 90) of the first side surface of the second stator assembly. Each of the alignment pilots may comprise an outer annular step. The stator assembly may comprise a first end bearing assembly (91) positioned axially outside the first stator assembly relative to the bearing assembly and forming a fourth inner surface (92, 93, 94) of the stator opening, at least a portion of which (93) has a diameter (52) less than the first diameter (38), and a second end bearing assembly (104) position axially outside the second stator assembly relative to the bearing assembly (39) and forming a fifth inner surface (108, 109, 110) of the stator opening, at least a portion of which (109) has a diameter (52) less than the first diameter (38). The stator, the shaft and the chamber may be configured and arranged such that liquid will substantially flow in a clearance gap (120) between an inner surface (35, 36) of the stator and an outer surface (83) of the shaft with linear movement of the shaft relative to the stator. The third inner surface of the stator opening formed by the bearing assembly (39) may comprise a frusto-conical tapered surface (44/42). The frusto-conical surface may funnel the liquid to provide a high pressure annular volume proximate the third inner surface of the stator opening formed by the bearing assembly.

In another aspect, a linear actuator for pumping (20) is provided comprising a stator having an inner opening, a shaft comprising a plurality of permanent magnets spaced linearly in the axial direction, the shaft disposed in the stator opening and configured and arranged to reciprocate linearly in the axial direction relative to the stator under the interaction of a magnet field generated by the stator and the magnets, the stator comprising a first stator assembly comprising a plurality of pole sections spaced linearly in the axial direction and a plurality of coils disposed therebetween, the plurality of pole sections forming a first inner surface of the stator opening of a first diameter, a second stator assembly comprising a plurality of pole sections spaced linearly in the axial direction and a plurality of coils disposed therebetween, the plurality of pole sections forming a second inner surface of the stator opening of the first diameter, a bearing assembly positioned axially between the first stator assembly and the second stator assembly and forming a third inner surface of the stator opening, at least a portion of which has a second diameter less than the first diameter, and the bearing assembly having a width that is a function of the spacing of the plurality of pole sections of the first stator assembly and the second assembly and the spacing of the plurality of permanent magnets of the shaft.

The stator may further comprise a third stator assembly comprising a plurality of pole sections spaced linearly in the axial direction and a plurality of coils disposed therebetween, the plurality of pole sections forming a fourth inner surface of the stator opening of the first diameter, and a second bearing assembly positioned axially between the second stator assembly and the third stator assembly and forming a fifth inner surface of the stator opening, at least a portion of which has a third diameter less than the first diameter, the second bearing assembly having a width that is a function of the spacing of the plurality of pole sections of the first stator assembly, the second stator assembly, the third stator assembly and the spacing of the plurality of permanent magnets of the shaft. The first stator assembly may comprise a first side surface having an alignment pilot, the second stator assembly may comprise the first side surface having an alignment pilot, the bearing assembly may comprise a first side surface having an alignment pilot in mating relationship with the alignment pilot of the first side surface of the first stator assembly, and the bearing assembly may comprise a second side surface having an alignment pilot in mating relationship with the alignment pilot of the first side surface of the second stator assembly. The alignment pilots may comprise an outer annular step. The linear actuator may further comprise a housing defining a chamber substantially isolated from an environment outside the housing, the stator and the shaft disposed in the chamber and the chamber containing a liquid and the liquid substantially sealed within the chamber. The housing may comprise a first cylinder portion defining a first sub-chamber, a second cylinder portion defining a second sub-chamber, and a third cylinder portion defining a third sub-chamber, the stator may be disposed in the second sub-chamber and fixed to the second cylinder portion, and the shaft may be configured and arranged to reciprocate linearly in a first axial direction into the first sub-chamber and to reciprocate linearly in a second axial direction into the third sub-chamber. The third inner surface of the stator opening formed by the bearing assembly my comprise a frusto-conical tapered surface. The frusto-conical tapered surface may funnel the liquid to provide a high pressure annular volume proximate to the third inner surface of the stator opening formed by the bearing assembly.

In another aspect, a linear actuator for pumping is provided comprising a stator having an inner opening, a shaft comprising a plurality of permanent magnets spaced linearly in the axial direction and having an inner passage extending axially through at least a portion of the shaft, the shaft disposed in the stator opening and configured and arranged to reciprocate linearly in the axial direction relative to the stator under the interaction of a magnet field generated by the stator and the magnets, a housing defining a chamber substantially isolated from an environment outside the housing, the stator and the shaft disposed in the chamber, the chamber containing a liquid and the liquid substantially sealed within the chamber, and the shaft and chamber configured and arranged such that the liquid will substantially flow through the inner passage of the shaft with linear movement of the shaft relative to the stator.

The housing may comprise a first cylinder portion defining a first sub-chamber, a second cylinder portion defining a second sub-chamber and a third cylinder portion defining a third sub-chamber, the stator may be disposed in the second sub-chamber and fixed to the second cylinder portion, and the shaft may be configured and arranged to reciprocate linearly in a first axial direction into the first sub-chamber and to reciprocate linearly in a second axial direction into the third sub-chamber. The housing may comprise a first end portion at a first distal end of the first cylinder portion and the linear actuator may comprise an actuator rod connected to a first distal end of the shaft for movement therewith and disposed in the first sub-chamber and having a portion sealing penetrating the first end portion of the housing. The actuator rod and the first end of the shaft may be connected by an alignment swivel coupling. The first end of the shaft may comprise at least one side passage extending through the shaft from the inner axial passage of the shaft to an outer surface of the shaft. The stator, the shaft and the chamber may be configured and arranged such that liquid will substantially flow in a clearance gap between the inner surface of the stator and the outer surface of the shaft with linear movement of the shaft relative to the stator. The stator, the housing and the chamber may be configured and arranged such that liquid will substantially flow in a clearance gap (121) between an inner surface (119) of the housing and an outer surface (124, 125) of the stator with linear movement of the shaft relative to the stator.

In another aspect, a linear actuator for pumping is provided comprising a stator having an inner opening, a shaft comprising a plurality of permanent magnets spaced linearly in an axial direction and having an inner passage extending axially through at least a portion of the shaft, the shaft disposed in the stator opening and configured and arranged to reciprocate linearly in the axial direction relative to the stator under the interaction of a magnetic field generated by the stator and the magnets, a housing defining a chamber substantially isolated from an environment outside the housing, the stator and the shaft disposed in the chamber, the chamber containing a liquid and the liquid substantially sealed within the chamber, and a pressure compensator configured and arranged to normalize pressure differences between outside the chamber and inside the chamber.

The pressure compensator may comprise a bladder in the chamber and a pressure port extending through a first end cap of the housing and communicating between an interior of the bladder and outside of the housing. The housing may comprise a first cylinder portion defining a first sub-chamber, a second cylinder portion defining a second sub-chamber, and a third cylinder portion defining a third sub-chamber, the stator may be disposed in the second sub-chamber and fixed to the second cylinder portion, the shaft may be configured and arranged to reciprocate linearly in a first axial direction into the first sub-chamber and to reciprocate linearly in a second axial direction into the third sub-chamber, and the pressure compensator may be disposed in the third sub-chamber. The housing may comprise a second end cap at a first distal end of the first cylinder portion and the linear actuator may comprise an actuator rod connected to a first distal end of the shaft for movement therewith and disposed in the first chamber and having a portion sealingly penetrating the second end cap.

BRIEF DESCRIPTION OF THE DRAWINGS

FIG. 13 is an enlarged cross-sectional view of the shaft to rod coupling shown in FIG. 10, taken within the indicated rectangle C of FIG. 10, when the shaft is extending.

FIG. 14 is an enlarged cross-sectional view of the shaft to rod coupling shown in FIG. 12, taken within the indicated rectangle C of FIG. 12, when the shaft is retracting.

FIG. 15 is an enlarged cross-sectional view of the shaft to rod coupling shown in FIG. 14, taken within the indicated circle F of FIG. 14.

FIG. 24 is an enlarged cross-sectional view of the right shaft bearing assembly shown in FIG. 10, taken within the indicated rectangle F of FIG. 10, when the shaft is extending.

FIG. 25 is an enlarged cross-sectional view of the right shaft bearing assembly shown in FIG. 24, taken within the indicated circle K of FIG. 24.

FIG. 26 is an enlarged cross-sectional view of the right shaft bearing assembly shown in FIG. 12, taken within the indicated rectangle E of FIG. 12, when the shaft is retracting.

FIG. 27 is an enlarged cross-sectional view of the right shaft bearing assembly shown in FIG. 26, taken within the indicated circle H of FIG. 26.

FIG. 28 is an enlarged cross-sectional view of the right shaft bearing assembly shown in FIG. 26, taken within the indicated circle J of FIG. 26.

DESCRIPTION OF THE PREFERRED EMBODIMENTS

Figure 1:
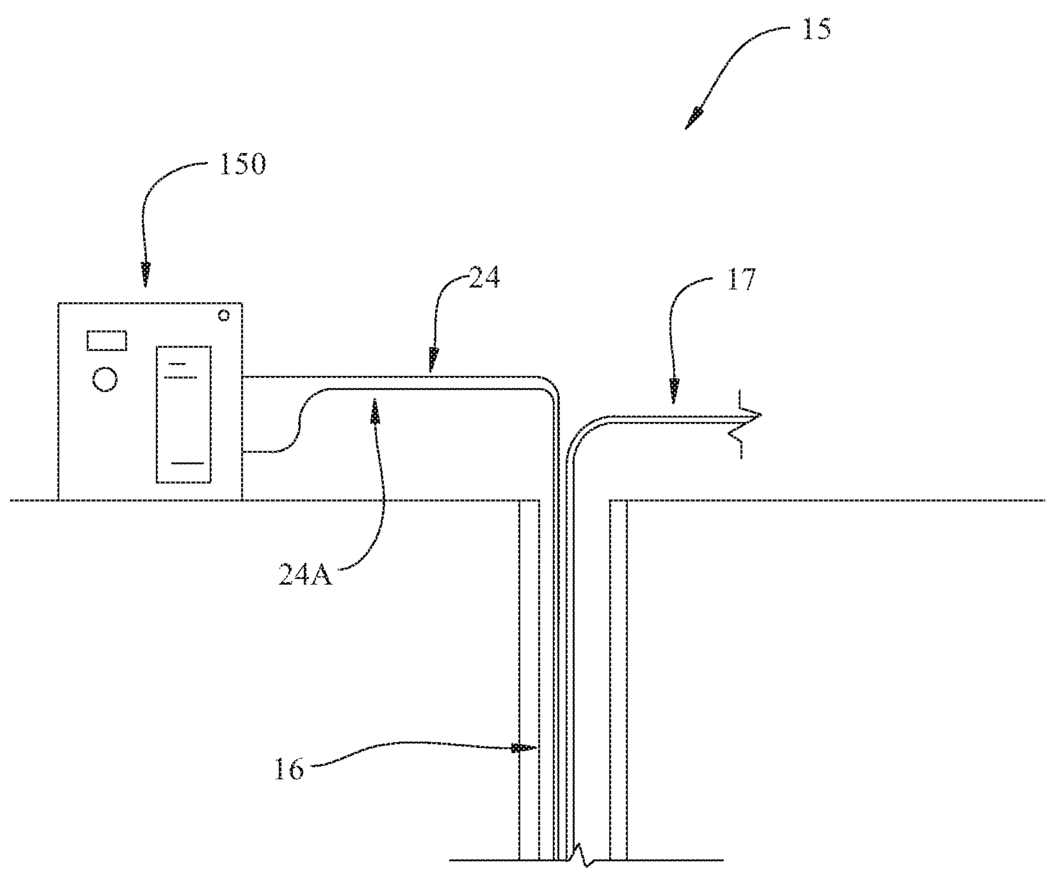
FIG. 1 is a schematic vertical sectional view of an oil-well installation showing a actuator and pump system having an embodiment of an improved linear actuator assembly.
Figure 1:
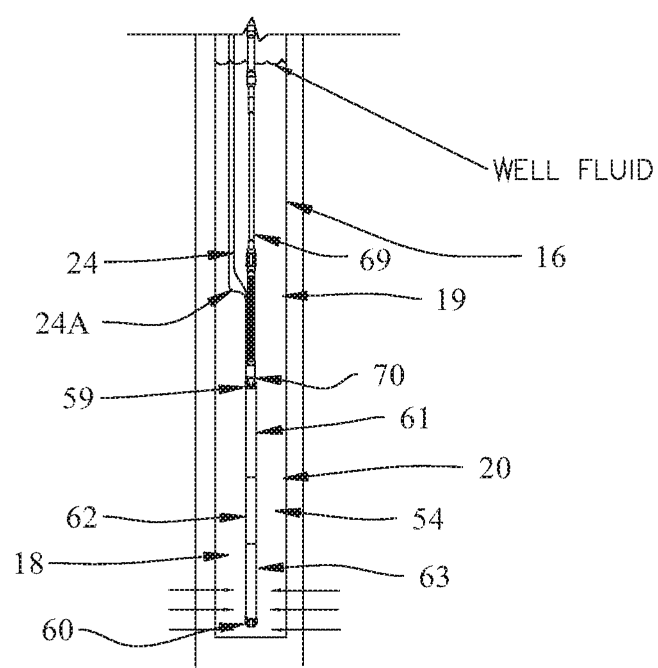

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1, an oil well pump and linear magnetic motor system is provided, a first embodiment of which is generally indicated at 15. As shown, a well hole extends from the surface level to a point below ground. The well hole is lined with casing 16 to form well bore 18 that includes perforations providing fluid communication between well bore 18 and a hydrocarbon-bearing formation there around. Pump 19 and linear actuator or motor 20 are disposed at the bottom of well bore 18 and are provided to artificially lift production fluid from well bore 18 through tubing string 17 to a collection point at the surface.

More specifically, production fluid migrates from the subsurface formation through perforations in casing 16 and collects in well bore. Pump 19 generally comprises cylindrical housing 69 and inner reciprocating piston 70. Linear actuator 20 is disposed below pump 19 in well bore 18 and the bottom end of housing 69 of pump 19 is threadably connected to the top end of housing 54 of linear actuator 20. Linear actuator 20 includes stator 21 and shaft 23, which is connected to piston 70 by actuator rod 64. Linear actuator 20 is powered by electric cable 24 extending from a motor driver in controller cabinet 150 at the surface to the bottom of well bore 18. The power supply generates a magnetic field within coils 32 and 35 of stator 21, which in turn imparts an oscillating force on magnetic shaft 23 and actuator rod 64. Shaft 23 and actuator rod 64 are thereby translated in an up and down or linear fashion within well bore 18, which thus imparts linear movement to pump piston 70. This enables piston 70 of pump 19 to reciprocate vertically, thereby enabling fluids to be lifted with each stroke of piston 70 towards the surface of well 18. Pump inlets disposed at the bottom end of pump housing 69 and a pump outlet is disposed at the top end of piston 70. Pump 19 forces a first volume of fluid upward within production tubing 16 during an upstroke of piston 70 in pump housing 69 and a second volume of fluid upward within production tubing 16 during a downstroke of piston 70 in pump housing 69.

Pump 19 and linear actuator 20 may include several sensors for monitoring pump and motor operation and may receive commands from the surface. Such signals and commands are communicated by signal cable (24A), which extends from actuator 20 to controller cabinet 150 at the surface of well 18.

Figure 2:
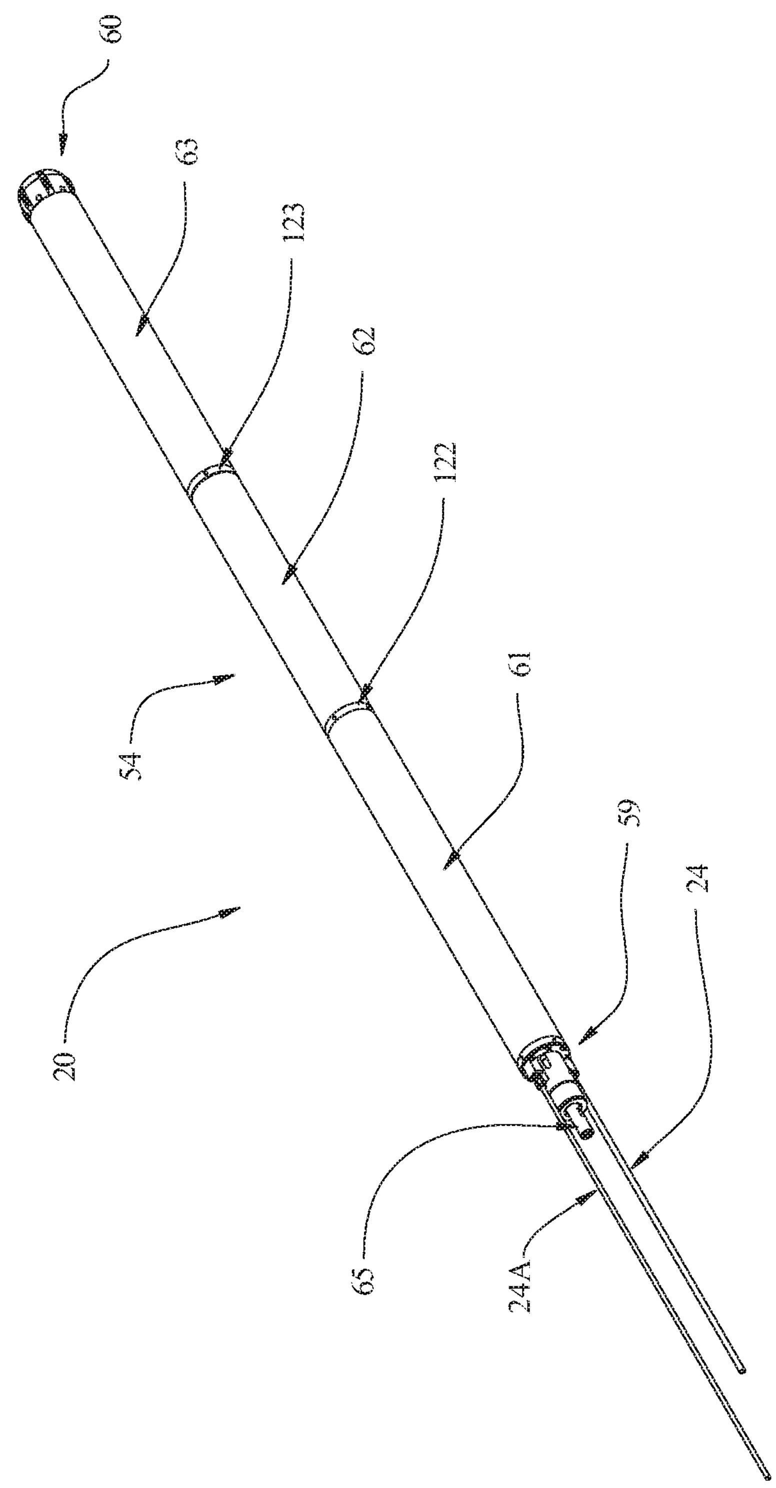
FIG. 2 is an isometric view of the linear actuator assembly shown in FIG. 1.
Figure 3:
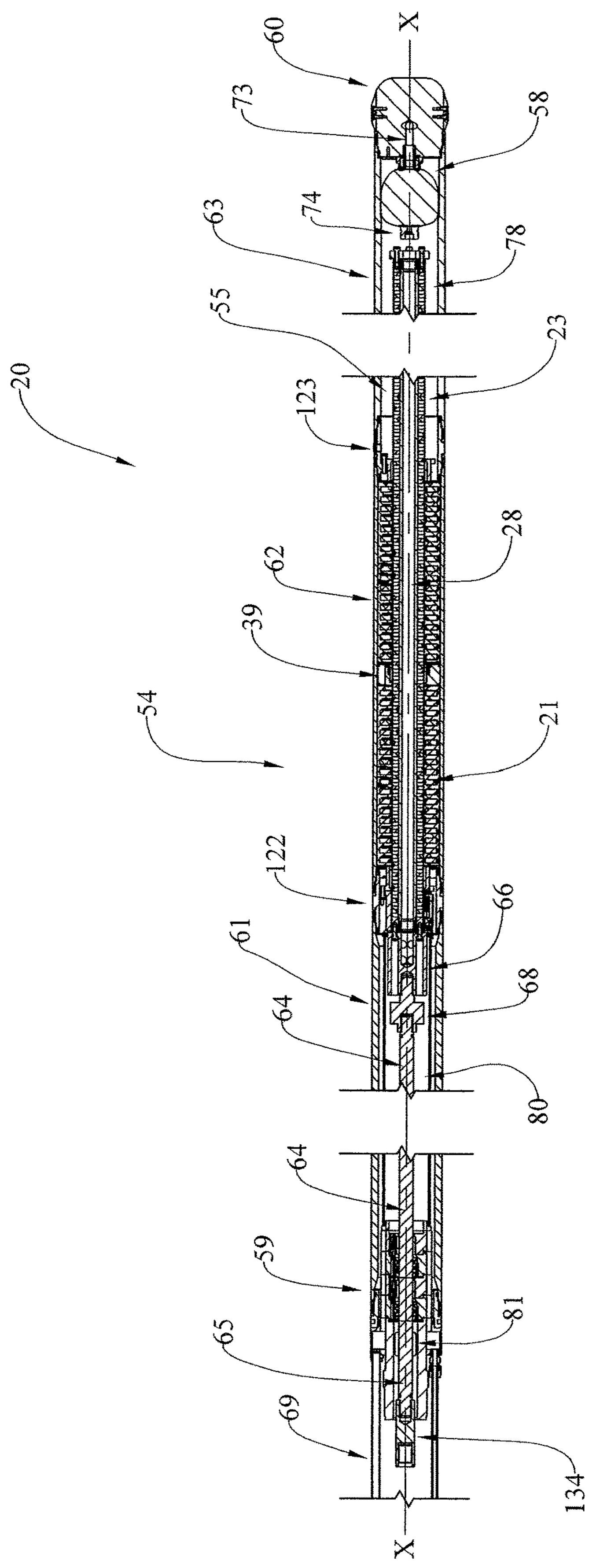
FIG. 3 is a partial vertical cross-sectional view of the linear actuator assembly shown in FIG. 2.

With references to FIGS. 2 and 3, linear actuator 20 generally comprises housing 54, stator 21, shaft 23, actuator rod 64 and pressure compensator 58. Housing 54 is formed of three tubular cylindrical sections 61, 62 and 63, connected through stator end caps 122 and 123, upper end cap 59 and lower end cap 60. Lower end cap 60 and pressure compensator 58 seal the bottom end of interior chamber 55 and housing 54 from the outside environment. Upper end cap 59 controllably seals the top end of interior chamber 55 and housing 54 from the outside environment. The interior volumes of tubular sections 61, 62 and 63 generally define top sub-chamber 80, center sub-chamber 79 and bottom sub-chamber 78 of chamber 54, respectively.

Stator 21, shaft 23, actuator rod 64 and pressure compensator 58 are disposed in cylindrical housing 54, with section 62 of housing 54 acting as the outer sleeve of stator 21. Upper end cap 122 of stator 21 is retained and held in place between upper section 61 and middle section 62 of housing 54, and lower end cap 123 of stator 21 is retained between middle section 62 and lower section 63 of housing 54. Thus, stator 21 does not move axially relative to housing 54. Upper end cap 59 is threadably connected to the upper cylindrical end of housing section 61, upper stator end cap 122 is threadably connected on one side to the lower cylindrical end of housing section 61 and threadably connected on the other side to the upper cylindrical end of housing section 62. Stator end cap 123 is threadably connected to the lower cylindrical end of housing section 62 on one side and is threadably connected to the upper cylindrical end of housing section 63 on the other side. Lower end cap 60 is threadably connected to the lower cylindrical end of housing section 63, thereby forming an interior chamber 55 that is substantially isolated from the outside or downhole environment. Lower end cap 60 may include outwardly protruding wings to keep housing 54 centered in well casing 16. Upper end cap 59 includes seal assemblies that seal motor oil in chamber 55 of housing 54 and through which actuator rod 64 sealably extends for axial reciprocal movement. Lower end cap 60 in turn includes an exterior port 73 that allows for fluid and pressure communication between the outside of housing 54 and interior isolated chamber 76 in pressure compensator 58.

Figure 4:
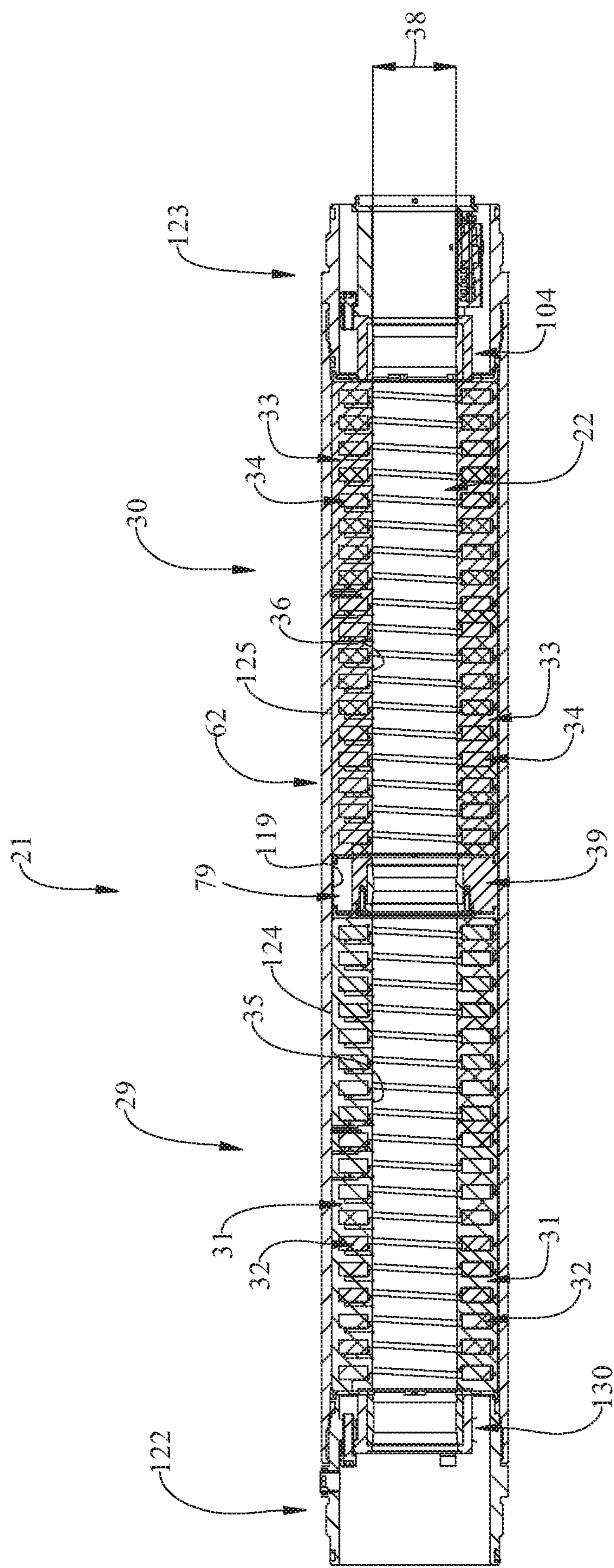
FIG. 4 is an enlarged cross-sectional view of the stator and shaft assembly shown in FIG. 3.

As shown in FIGS. 3 and 4, linear magnetic motor 20 generally includes stator 21 and shaft 23. Stator 21 is a generally hollow cylindrical member elongated about axis x-x and having inner cylindrical passage 22. Shaft 23 is a generally hollow cylindrical member coincident with stator 21 and moves linearly along axis x-x through passage 22 relative to stator 21. Movement along axis x-x is referred to herein as movement in the axial direction.

As shown in FIG. 4, stator 21 comprises two separate and modular stator assemblies 29 and 30 axially connected by center bearing assembly 39. While this embodiment shows two separate stator modules 29 and 30, it should be understood that any desired number of stator modules may be employed to provide the desired actuation force. For example, two bearings of the structure shown in bearing 39 of FIG. 4 may be placed between three stator modules of varying lengths. The number of stator modules and the lengths of such stator modules may therefore be increased or decreased as desired.

Each of modular stator assemblies 29 and 30 are formed from nineteen pole sections, severally indicated at 31 and 32, respectively, that are stacked in the axial direction to form recesses therebetween. These individual stator pole sections are glued or bolted together, with coils 32 and 33, respectively, therebetween, to form stator assemblies 29 and 30, respectively. Stator 21 includes end pieces 122 and 123 that are fixed to either end of the stacked pole sections to form stator 21. Recess between the pole sections house conventional coils, severally indicated at 32 and 33, respectively, which are energized as desired to magnetically interact with shaft 23 to cause axial movement of shaft 23 relative to stator 21. The interior surface 35 and 36 of stator modules 29 and 30, respectively, provide cylindrical opening 22 of constant diameter 38 along the length thereof. Thus, first modular stator assembly 29 is formed with nineteen stacked pole pieces 31 having recesses therebetween containing eighteen coils 32. The inner surfaces of stacked annular pole pieces 31 align to form inner surface 35 of constant diameter 38 therealong. The outer surfaces of stacked pole pieces 31 align to define outer cylindrical surface 124 of modular stator assembly 29. Similarly, second modular stator assembly 30 is formed with nineteen stacked pole pieces 32 having recesses therebetween containing eighteen coils 33. The inner surfaces of stacked annular pole pieces 32 align to form inner surface 36 of constant diameter 38 therealong and the outer surfaces of stacked pole pieces 32 align to define outer cylindrical surface 125 of second modular stator assembly 30.

As a result, linear motor 20 is scalable in size by adding triplets of coil windings and stator pole pieces to improve the force output for a given current. For example, increasing the size from three to six coils will roughly double the force output, as will doubling from six to twelve coils. By stacking shorter modular stator assemblies 29 and 30 in tandem, separated by central bearing 126 having a precision width 53 that separates the stacked stators while maintaining the critical magnetic pitch of the motor, the distance between end bearings and the unsupported shaft is reduced. Multiple shorter stator assemblies may be stacked in this manner in order to increase the force output for a given diameter motor.

Figure 5:
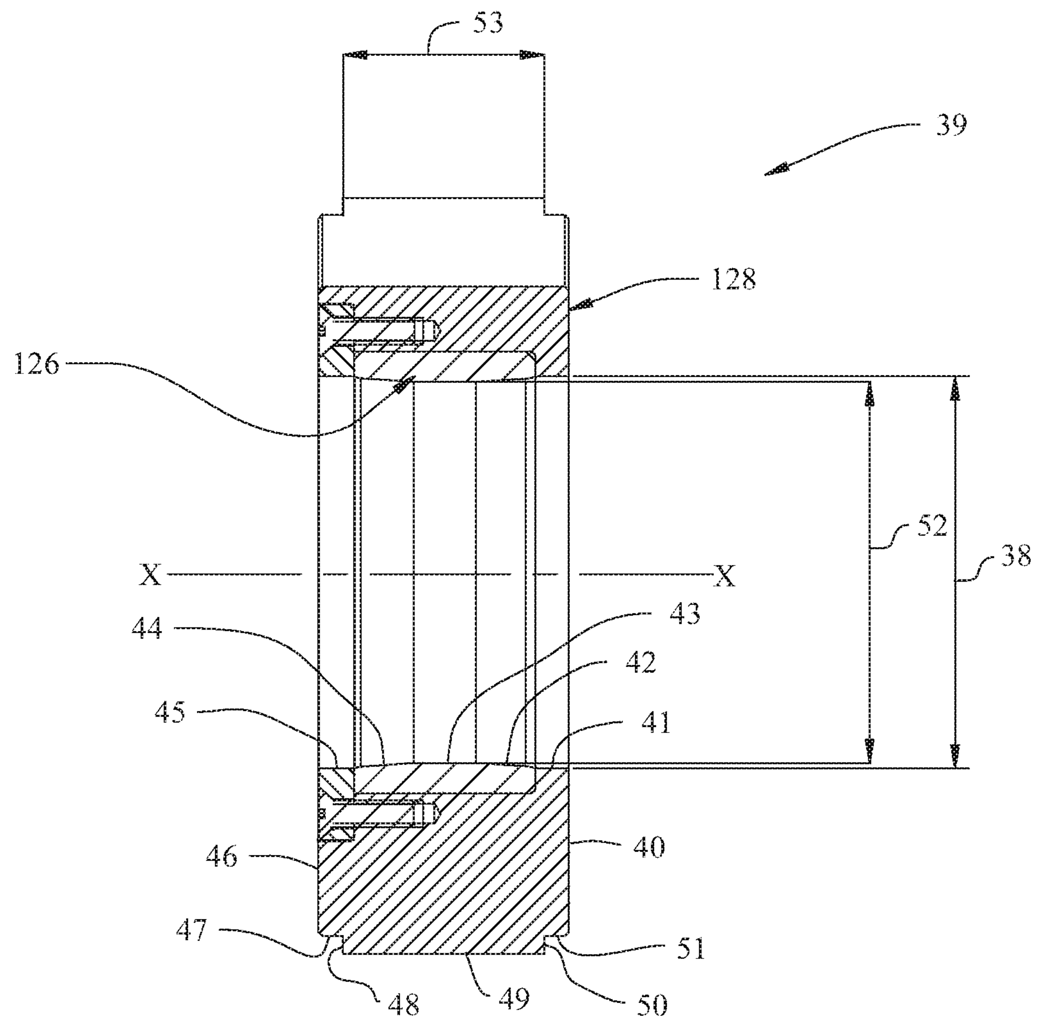
FIG. 5 is an enlarged cross-sectional view of the center bearing shown in FIG. 4.
Figures 6, 7:
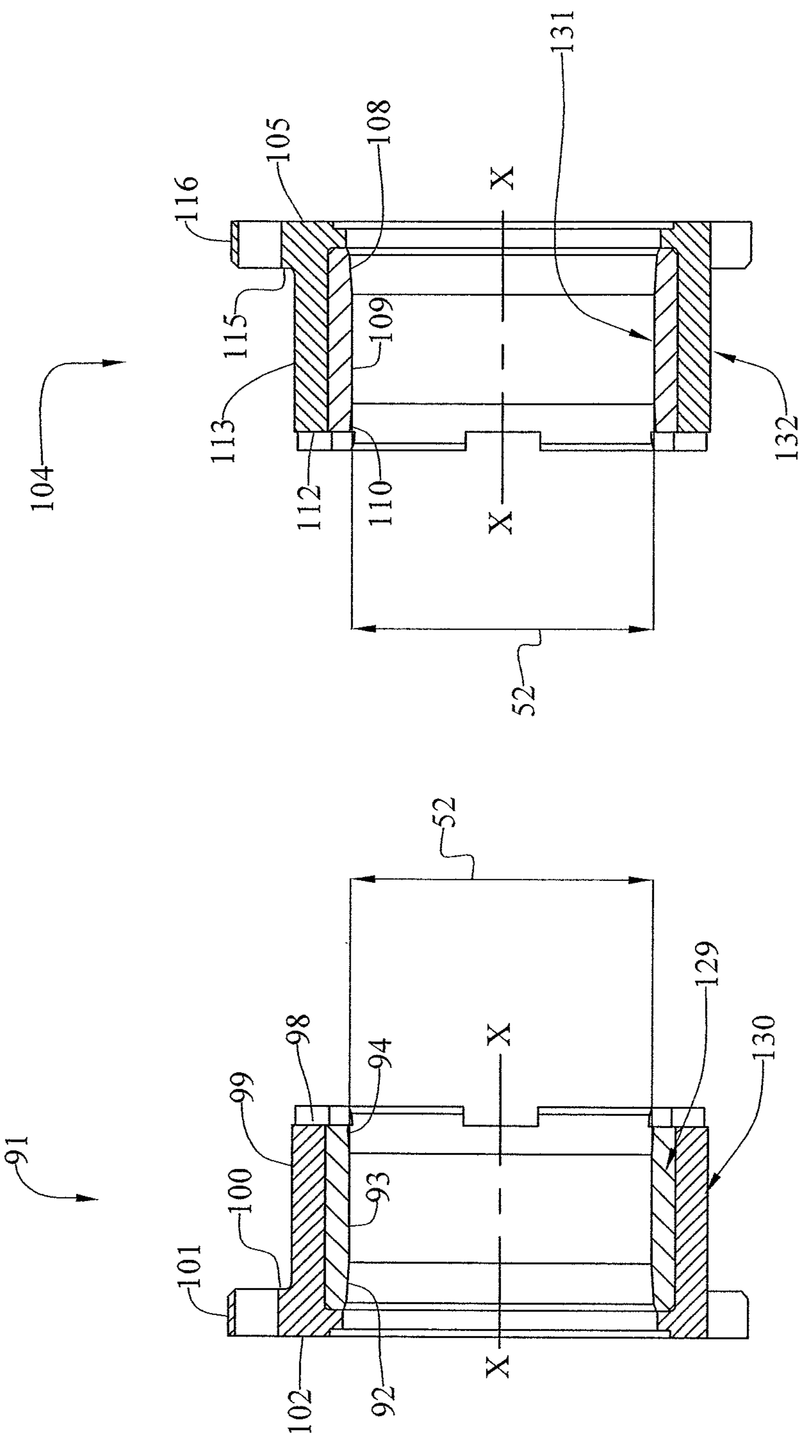
FIG. 6 is an enlarged cross-sectional view of the left bearing shown in FIG. 4.
FIG. 7 is an enlarged cross-sectional view of the right bearing shown in FIG. 4.

As shown in FIGS. 5-7, stator 21 includes center bearing assembly 39 between modular stator assembly 29 and modular stator assembly 30, as well as a left or upper bearing assembly 91 and a right or lower bearing assembly 104. As shown in FIG. 5, center bearing assembly 39 generally includes non-magnetic bearing housing 128 and bearing 126 that, together, generally define a cylindrical generally ring-shaped annular structure. Referring now to FIG. 5, this structure is a specially configured solid member elongated along axis x-x and is generally bounded by a rightwardly-facing annular vertical surface 40, an outwardly-facing horizontal cylindrical surface 51, a rightwardly-facing annular vertical surface 50, an outwardly-facing horizontal cylindrical surface 49, a leftwardly-facing annular vertical surface 48, an outwardly-facing horizontal cylindrical surface 47, a leftwardly-facing annular vertical surface 46, a inwardly-facing horizontal cylindrical surface 45, a leftwardly and inwardly-facing frusto-conical surface 44, an inwardly-facing horizontal cylindrical surface 43, a rightwardly and inwardly-facing frusto-conical surface 42 and an inwardly-facing horizontal cylindrical surface 41, joined at its right marginal end to the inner marginal end of surface 40. Multiple threaded bores are circumferentially spaced in surface 45 and surface 40 (not shown) such that screws may be used to fix center bearing assembly 39 to the respective end faces of stator assemblies 29 and 30. Thus, bearing housing 128 holding bearing 126 may be fixed to the respective stator assemblies 29 and 30.

As shown, cylindrical surfaces 41 and 45 each have an inner diameter that is the same as the inner diameter 38 of surfaces 35 and 36 of stator assemblies 29 and 30, respectively. However, surfaces 42 and 44 are frusto-conical and tapered inwardly to cylindrical surface 43 such that cylindrical surface 43 of center bearing 126 has inner diameter 52 that is slightly less than inner diameter 38 of center bearing housing 128 and stator assemblies 29 and 30. This tapered shape helps facilitate the formation of a lubricating film between bearing 126 and the exterior surface 83 of shaft 23. The motor oil contained in sealed chamber 55 and the movement of shaft 23 in shaft passage 28 acts to generate pressure and creates a hydro-dynamic bearing such that shaft 23 rides on a fluid film layer in gap 120 between bearing 126 and shaft 23.

With reference to FIG. 6, left bearing assembly 91 includes bearing housing 130 holding bearing 129. Bearing housing 130 and bearing 129, together, generally define a cylindrical generally ring-shaped annular structure. This structure is elongated along axis x-x and is generally bounded by a rightwardly-facing vertical annular surface 98, an outwardly-facing horizontal cylindrical surface 99, a rightwardly-facing annular vertical surface 100, an outwardly-facing horizontal cylindrical surface 101, a leftwardly-facing vertical annular surface 102, a leftwardly and outwardly-facing frusto-conical surface 92, an inwardly-facing cylindrical surface 93, and a rightwardly and inwardly-facing frusto-conical surface 94. As with the center bearing, surfaces 92, 93 and 94 define the bearing surface of bearing 129 and surface 93 has an inner diameter 52 that is slightly less than the inner diameter 38 of passage 22 of stator assemblies 29 and 30. Thus, surfaces 92, 93 and 94 help create another hydro-dynamic bearing so that shaft 23 rides on a fluid film layer rather than having metal-on-metal contact.

With reference to FIG. 7, right bearing assembly 104 includes bearing housing 132 and bearing 131. Bearing housing 132 and bearing 131, together, define a cylindrical generally ring-shaped annular structure. This structure is elongated along axis x-x, and is generally bounded by a rightwardly-facing annular vertical surface 105, outwardly-facing horizontal cylindrical surface 116, leftwardly-facing vertical annular surface 115, outwardly-facing horizontal cylindrical surface 113, leftwardly-facing annular vertical surface 112, leftwardly and inwardly-facing frusto-conical surface 110, inwardly-facing horizontal cylindrical surface 109, and rightwardly and inwardly-facing frusto-conical surface 108. Surfaces 108, 109 and 110 define the bearing surface of bearing assembly 104. As with left bearing assembly 91, surface 109 of bearing 131 has inner diameter 52 that is slightly less than diameter 38 of inner surfaces 35 and 36 of stator assemblies 29 and 30. Thus, surfaces 108, 109 and 110 help create another hydro-dynamic bearing so that shaft 23 rides on a fluid film layer rather than having metal-on-metal contact.

Figure 8:
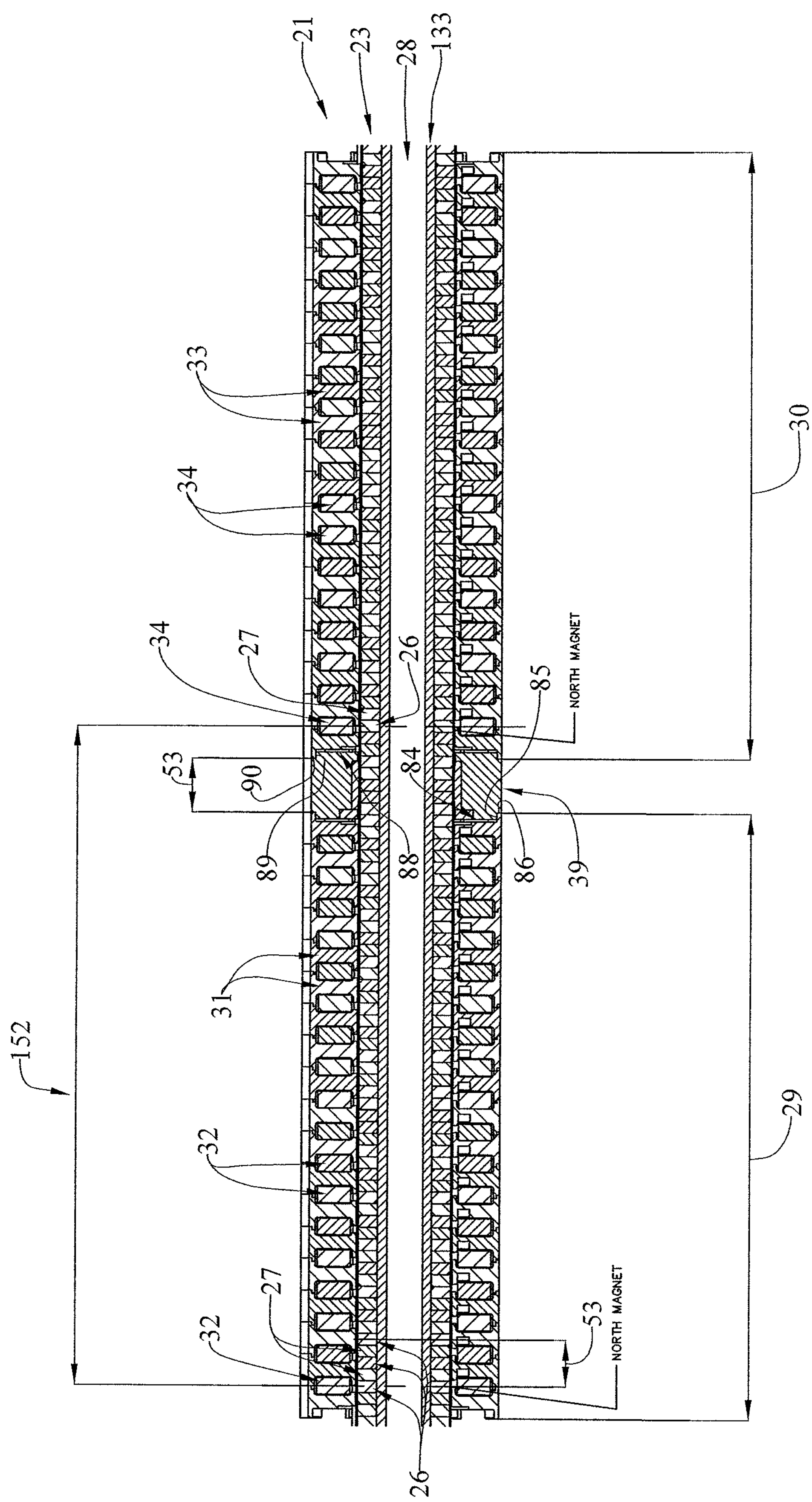
FIG. 8 is a schematic view showing the spacing for providing a desired magnetic cycle for the stator and shaft assembly shown in FIG. 4.

As shown in FIG. 8, the right side end face 85 of bearing assembly 29 abuts surface 46 of center bearing assembly 39. End face 85 includes an annular step defined by inwardly-facing horizontal cylindrical surface 85 and rightwardly-facing annular vertical surface 86. Similarly, the left end face 88 of stator assembly 30 includes an annular step defined by inwardly-facing horizontal cylindrical surface 89 and leftwardly-facing vertical annular surface 90. Surfaces 85 and 86 of stator assembly 29 are dimensioned such that they radially lock in the corresponding annular step defined by surfaces 47 and 48 in center bearing assembly 39. Similarly, surfaces 89 and 90 of stator assembly 30 are dimensioned such that they radially lock in the annular step defined by surfaces 50 and 51 of bearing assembly 39. These respective pilot contours provide an interlocking joint on the stator pole edges that allow for near perfect radial alignment from stator assembly 29 to bearing assembly 39 and from bearing assembly 39 to stator assembly 30 while also providing mechanical support for stator assembly 21. Such pilot contours are continued from pole piece-to-pole piece in the respective pole pieces of stator assemblies 29 and 30. This interlocking joint also simplifies the assembly process and aides in the alignment for the bearings. This alignment is particularly important because the stator pole pieces and bearings must be aligned concentrically to maintain uniform clearance 120 between the outer surface 83 of shaft 23 and the inner surfaces 35 and 36 of stator assembly 21 for maximum performance.

As shown in FIG. 8, shaft 23 is a specially configured tubular cylindrical member comprising equally spaced permanent magnets 26 separated by pole sections 27 and having a hollow inner core or sleeve 133 that defines inner fluid passage 28. In particular, tubular core 133, annular permanent magnets 26, and pole pieces 27 are assembled to form shaft 23. Core 133 provides structural support and includes hollow passage 28. Permanent magnets 26 and pole pieces 27 serve to make the motor doubly salient by concentrating magnetic flux. Shaft 23 generates magnetic fields by virtue of having a series of built in permanent magnets 26 and stator 21 generates magnetic fields through a series of annular magnetic coils 32 and 34. By timing the flow of current in the coils with respect to the position or momentum of shaft 23, the interaction of magnetic forces from shaft 23 and stator 21 will actuate shaft 23 to move. Shaft 23 is constrained, by bearings 126, 129 and 132 of bearing assemblies 39, 91 and 104, respectively, to move linearly in the axial direction. As shown in FIGS. 18, 21, 23, 25, 27 and 28, an outer sleeve 118 at the outside diameter of permanent magnets 26 and pole pieces 27 may be included. Sleeve 118 provides a relatively smooth and low friction bearing surface and helps provide structural integrity for shaft 23. Annular magnets 26 and pole pieces 27 are stacked around hollow cylindrical core piece 133 to make a stacked sub-assembly. Magnets 26 and pole pieces 27 are stacked directly around core 133 in alternating fashion and are preferably orientated so that the poles of consecutive magnets are orientated in opposite directions on an alternating basis. Thus subassembly is then inserted in sleeve 118 to form shaft 23.

As shown in FIG. 8, the first coil of modular stator assembly 29 is aligned with the center of a north magnet 26 of shaft 23 and the first coil 34 of modular stator assembly 30 is aligned with the center of another north magnet 26 of shaft 23. In this embodiment a full magnetic cycle comprises two magnets 26 and two pole pieces 27. Thus, magnets 26 and pole pieces 27 are arranged on core 133 with a north orientated magnet, a pole piece, a south orientated magnet, and a pole piece, with this pattern continuing and one magnetic cycle being defined from the center of the first north orientated magnet to the center of the next north orientated magnet in the series. Because of this, center bearing assembly 39 has specially determined width 53 which corresponds with the magnet cycle of shaft 23. Thus, in this three phase embodiment, center bearing assembly 39 has width 53 equal to the distance 152, shown in FIG. 8, from the center of the north magnet 26 of shaft 23 aligned with the first (left) phase A coil 32 of modular stator assembly 29 to the center of the north magnet 26 of shaft 23 aligned with the first (left) phase A coil 34 of modular stator assembly 30 (such distance comprising a whole number of magnetic cycles), less the width of first modular stator assembly 29, thereby aligning the modular stator assemblies to the magnetic cycles of the continuous shaft. The number of magnet cycles determining the width of bearing housing 128 is selected to allow a bearing housing dimension sufficient to accommodate a center bearing 39 of desired width, without excessively extending the overall length of the combined modular stator assemblies 29 and 30. In this way, although stator 21 comprises two separate modular stator assemblies 29 and 30 with a center bearing assembly 39 therebetween, to the controlling electronics of actuator 20, it appears as one long stator without interruption due to the width 53 of bearing assembly 39.

As shown in FIG. 3, the left or upper end of shaft 23 includes shaft end cap 66, which is screwed to the left face of shaft 23. Shaft end cap 66 is in turn threadably connected to coupling 68. Coupling 68 is in turn connected to actuator rod 64 by a pin connection that allows actuator rod 64 to float or swivel with respect end cap 66 of shaft 23 and so that shaft 23 does not provide any side loads on actuator rod 64 where it penetrates the seal assemblies, including annular seal 81, in upper end cap 59 of housing 54. Coupling 68 corrects both angular as well as lateral misalignment of shaft 23 and actuator rod 64. Penetrating end 65 of actuator rod 64 includes coupling 134. Coupling 134 is threadably connected at its lower end to end portion 65 of rod 64 and has internal threads on the upper end that are dimensioned to receive the outer threaded cylindrical surface of the lower end of pump piston 70. When connected, piston 70 reciprocates with actuator rod 64 and shaft 23.

Chamber 55 in housing 54 is a closed system filled with motor oil. As described above, this motor oil acts as a hydro-dynamic bearing fluid in air gap 120 between outer surface 83 of shaft 23 and the bearing surfaces of bearing assemblies 39, 91 and 104. This closed system in chamber 55 of housing 54 provides a cooling function in addition to a lubricating function. As shown in FIGS. 9-28 and as described below, a number of specially configured fluid passages are provided in the interior components of the motor in housing 54 that are configured and arranged to provide oil flow and a cooling function.

Figure 9:
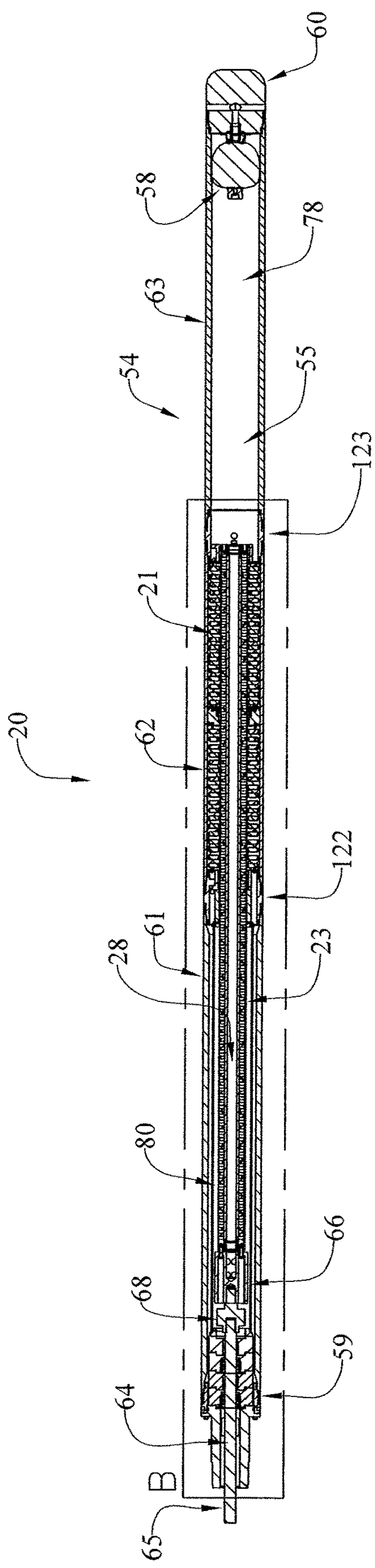
FIG. 9 is a vertical cross-sectional view of the linear actuator assembly shown in FIG. 2 in a fully extended position.
Figure 10:
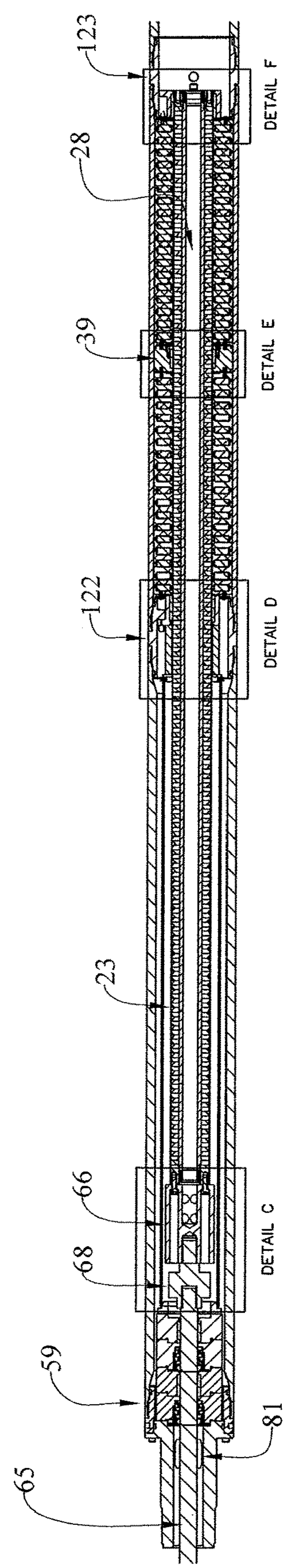
FIG. 10 is a partial cross-sectional view of the linear actuator assembly shown in FIG. 9, taken within the indicated rectangle B of FIG. 9.

FIGS. 9 and 10 show shaft 23 in the fully extended position with shaft 23 having just moved to the left, which in application in well 18 is in an upward direction. When shaft 23 is extending to the left as shown, oil will flow in the directions shown in FIGS. 13, 16-21, 24 and 25.

With reference to FIGS. 10, 13, 16-21, 24 and 25, as shaft 23 extends to the left relative to housing 54, the oil in chamber 55 is forced to move from sub-chamber 80 through channels 134 and 135 in shaft end cap 66, through side passages 82 in shaft end cap 66 and into fluid passage 28 of shaft 23, as shown in FIG. 13. The oil then moves to the right through passage 28 and exits from the open right end of passage 28 into sub-chamber 78, as shown in FIG. 24.

Figure 18:
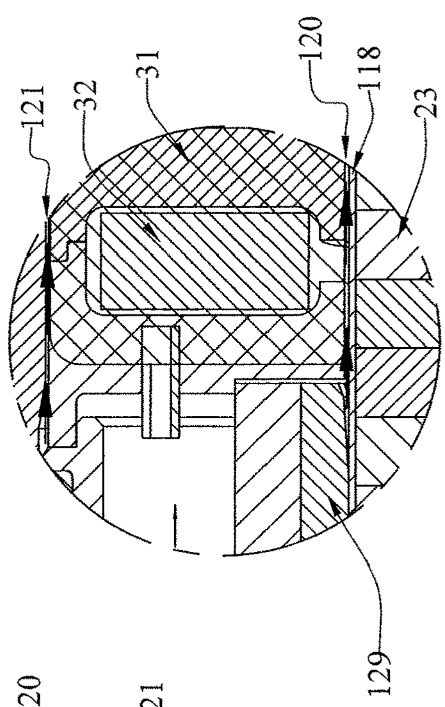
FIG. 18 is an enlarged cross-sectional view of the upper shaft bearing assembly shown in FIG. 16, taken within the indicated circle H of FIG. 16.
Figure 16:
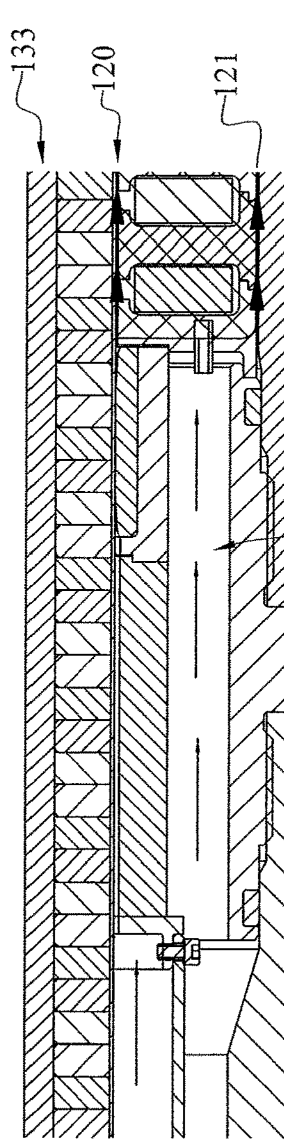
FIG. 16 is an enlarged cross-sectional view of the left or upper shaft bearing assembly shown in FIG. 10, taken within the indicated rectangle D of FIG. 10, when the shaft is extending.
Figures 19, 20, 21, 22, 23:
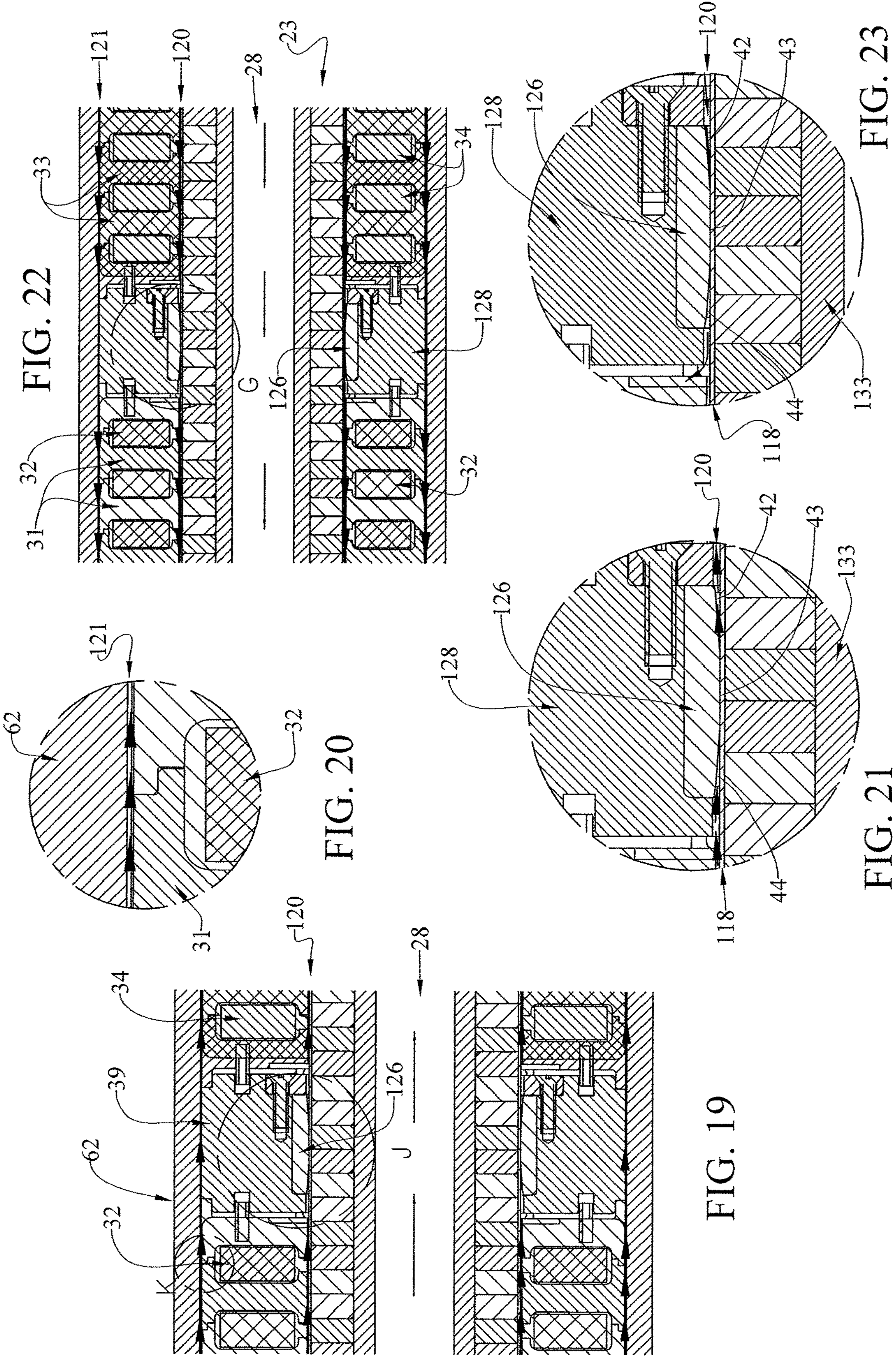
FIG. 19 is an enlarged cross-sectional view of the center shaft bearing assembly shown in FIG. 10, taken within the indicated rectangle E of FIG. 10, when the shaft is extending.
FIG. 20 is an enlarged cross-sectional view of the center shaft bearing assembly shown in FIG. 19, taken within the indicated circle K of FIG. 19.
FIG. 21 is an enlarged cross-sectional view of the center shaft bearing assembly shown in FIG. 19, taken within the indicated circle J of FIG. 19.
FIG. 22 is an enlarged cross-sectional view of the center shaft bearing assembly shown in FIG. 12, taken within the indicated rectangle D of FIG. 12, when the shaft is retracting.
FIG. 23 is an enlarged cross-sectional view of the center shaft bearing assembly shown in FIG. 22, taken within the indicated circle G of FIG. 22.

In addition, actuator 20 is configured and arranged such that oil will also move to the right from sub-chamber 80 into channels 138 and 139 in upper stator end cap 122, as shown in FIG. 16, and from there into air gap 121 between outer cylindrical surface 124 of first stator assembly 29 and inner surface 119 of housing 54, as shown in FIGS. 16 and 18. In addition, oil is forced to move from sub-chamber 80 into air gap 120 between outer surface 83 of shaft 23 and inner surface 35 of stator assembly 29, and past bearing 129, thereby providing a hydro-dynamic bearing film as described above, as shown in FIGS. 16, 17 and 18. Oil is then forced through air gaps 120 and 121 past central bearing assembly 39, as shown in FIGS. 19, 20 and 21, where the oil in air gap 120 also acts as a hydro-dynamic fluid bearing as described above. The oil exits the right end of air gap 121, which after bearing assembly 39 is between inner surface 119 of housing 54 and outer cylindrical surface 125 of second stator assembly 30, into sub-chamber 78, as shown in FIG. 25. The oil exits the right end of air gap 120, which after bearing assembly 39 is between outer surface 83 of shaft 23 and inner surface 36 of second stator assembly 30, into sub-chamber 78 after being propelled into and through the reduced air gap between right bearing 131 and sleeve 118 of shaft 23, where the oil in air gap 120 also acts as a hydro-dynamic fluid bearing as described above, as shown in FIGS. 24 and 25.

Figure 11:
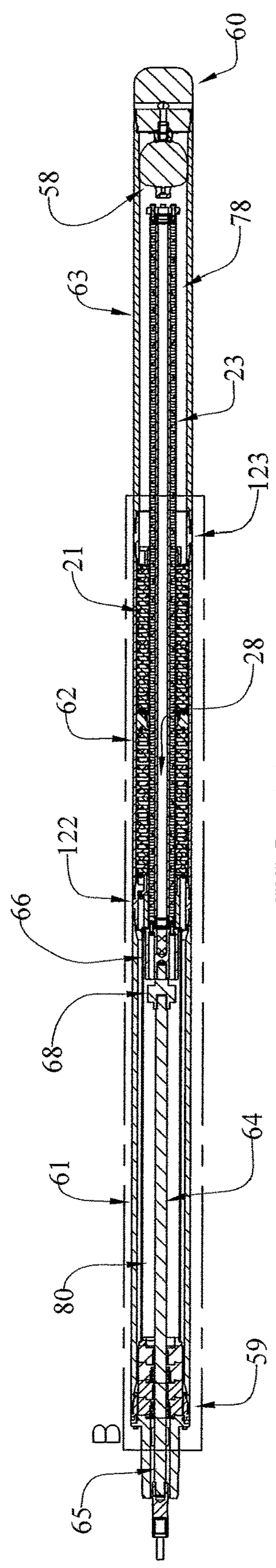
FIG. 11 is a vertical cross-sectional view of the linear actuator assembly shown in FIG. 2 in a fully retracted position.
Figure 12:
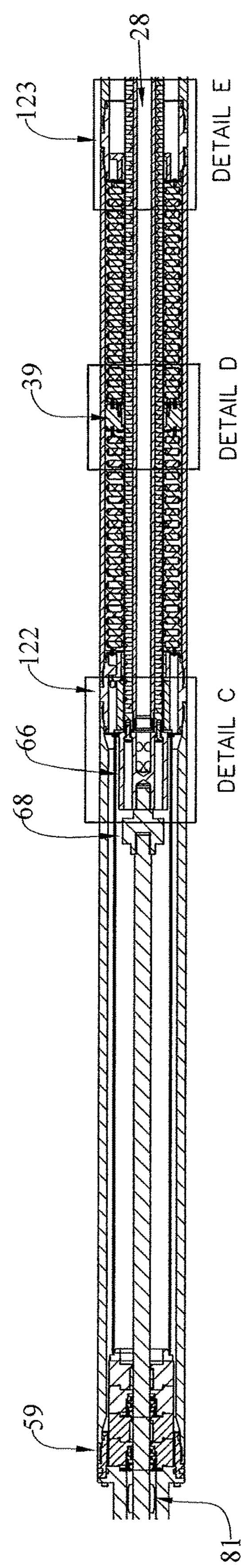
FIG. 12 is a partial cross-sectional view of the linear actuator assembly shown in FIG. 11, taken within the indicated rectangle B of FIG. 11.
Figure 17:
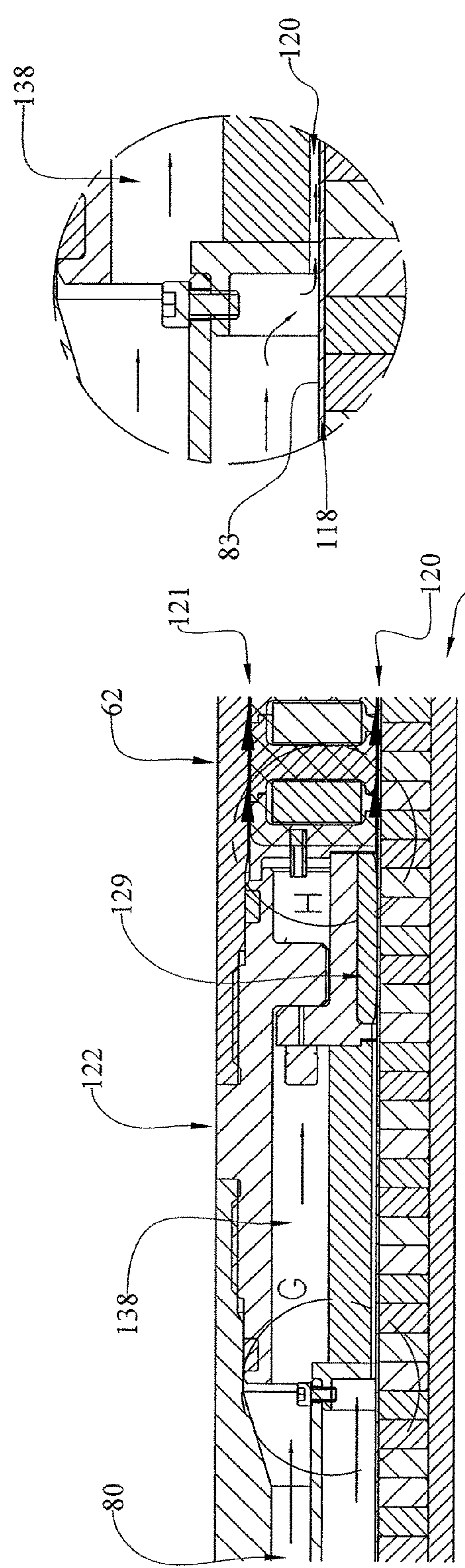
FIG. 17 is an enlarged cross-sectional view of the upper shaft bearing assembly shown in FIG. 16, taken within the indicated circle G of FIG. 16.

FIGS. 11 and 12 show shaft 23 in the fully retracted position with shaft 23 having just moved to the right, which in application in well 18 is in an downward direction. When shaft 23 is retracting to the right as shown, oil will flow in the directions shown in FIGS. 14, 15, 22, 23, and 26-28.

With reference to FIGS. 12, 14, 15, 22, 23, and 26-28, when shaft 23 is retracting to the right, oil flows from sub-chamber 78 into passage 28 of shaft 23, and to the left, as shown in FIG. 26. The oil then flows through passage 28, where it exits into sub-chamber 80 through side passages 82 and channels 134 and 135 in shaft end cap 66, as shown in FIG. 14.

In addition, actuator 20 is configured and arranged such that oil will also move to the left from sub-chamber 78 into air gap 121 between outer cylindrical surface 125 of second stator assembly 30 and inner surface 119 of housing 54, as shown in FIG. 26. In addition, oil is forced to move from sub-chamber 78 into air gap 120 between outer surface 83 of shaft 23 and inner surface 36 of stator assembly 30, and past bearing 131, thereby providing a hydro-dynamic bearing film as described above, as shown in FIG. 26. Oil is then forced through air gaps 120 and 121 past central bearing assembly 39, as shown in FIGS. 22 and 23, where the oil in narrowed air gap 120 also acts as a hydro-dynamic fluid bearing as described above. The oil exits the left end of air gap 121, which after bearing assembly 39 is between inner surface 119 of housing 54 and outer cylindrical surface 124 of first stator assembly 29, through channels 138 and 139 into sub-chamber 80, as shown in FIG. 14. The oil exits the left end of air gap 120, which after bearing assembly 39 is between outer surface 83 of shaft 23 and inner surface 35 of first stator assembly 29, into sub-chamber 80 after being propelled into and through the reduced air gap between left bearing 129 and sleeve 118 of shaft 23, where the oil in air gap 120 also acts as a hydro-dynamic fluid bearing as described above, as shown in FIGS. 14 and 15.

By filling chamber 55 of sealed housing 54 of actuator 20 with oil, thermal contact is maintained with almost all internal surfaces of the motor, allowing the oil to effectively carry heat away from the motor core and distribute the heat over the entire thermal mass of motor assembly 20. By employing hollow core 28 in shaft 23, the reciprocating motion of shaft 23 in sealed housing 54 acts as a coolant pump as oil moves through shaft 23 in passage 28 and the other cavities within the motor core, as described above, carrying heat away from the hottest part of the motor in center sub-chamber 79 to the cooler extremities of the assembly and outer sub-chambers 78 and 80, respectively. Although not shown, oil ports may be added at each end of actuator 20 that are connected to an external heat exchanger for an additional cooling effect.

Figures 29, 30, 31:
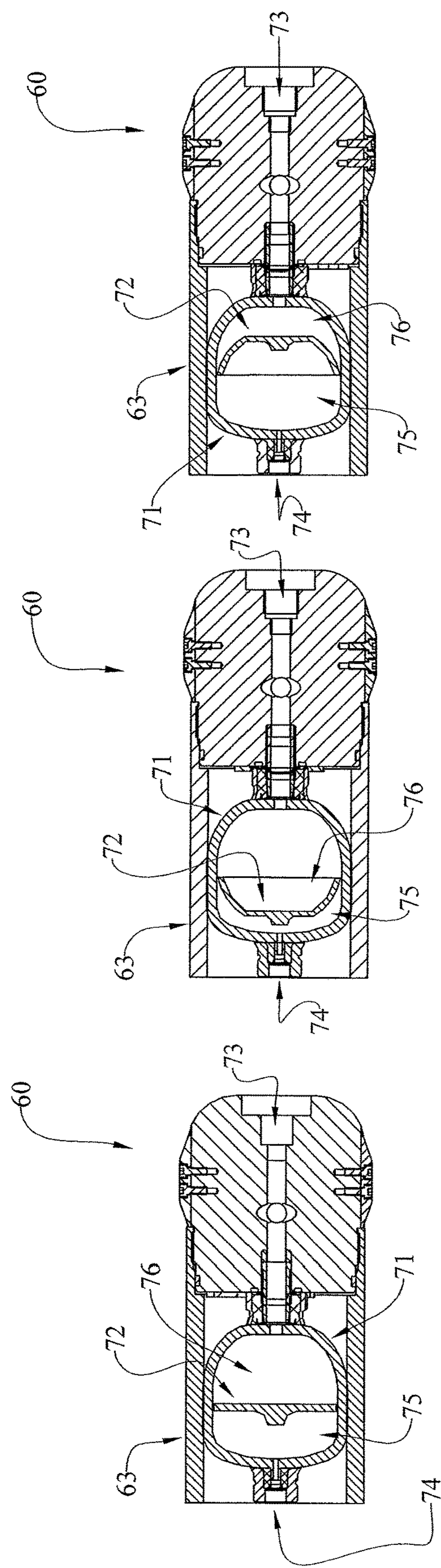
FIG. 29 is an enlarged cross-sectional view of the pressure compensator and housing end cap shown in FIG. 3 at sea level.
FIG. 30 is an enlarged cross-sectional view of the pressure compensator and housing end cap shown in FIG. 9 in a fully extended position at well depth pressure.
FIG. 31 is an enlarged cross-sectional view of the pressure compensator and housing end cap shown in FIG. 11 in a fully retracted position at well depth pressure.

As shown in FIGS. 29-31, pressure compensator 58 generally comprises steel pressure vessel 71 having internal deformable diaphragm 72 separating pressure vessel 71 into first sub-chamber 75 and second chamber 76. Diaphragm 72 is an elastomeric diaphragm or bladder that may expand and move while pressure vessel 71 is a steel vessel that is fixed to lower section 63 of housing 54. Chamber 76 is open to the outside environment and fluid in well 18 via exterior port 73 in lower end cap 60 of housing 54. Sub-chamber 75 operates as a hydraulic reservoir, through interior port 73, for motor oil and is sealed and pressure balanced from the outside environment by diaphragm 72. Thus, sub-chamber 75 communicates directly with sub-chamber 78 such that the pressure in sub-chamber 75 is transferred and equalized with the oil pressure in full chamber 55. FIG. 29 shows the volumes of sub-chamber 75 and chamber 76 and diaphragm 72 under atmospheric pressure.

FIG. 30 shows sub-chamber 75 and chamber 76 and diaphragm 72 when actuator 20 is placed into well 18 at a given depth and is subject to pressure greater than atmospheric pressure and when shaft 23 is fully extended as shown in FIGS. 9 and 10. As the motor oil is displaced in sub-chamber 78 and moves towards sub-chamber 80, diaphragm 72 is displaced by pressurized well fluid entering exterior port 73 into chamber 76.

FIG. 31 shows pressure compensator 58 when shaft 23 is fully retracted, as shown in FIGS. 11 and 12. As shown, the volume of sub-chamber 75 is increased relative to FIGS. 29 and 30 and the volume of chamber 76 is decreased as motor oil flowing through port 73 into sub-chamber 75 displaces well fluid in chamber 76 out through exterior port 73. Diaphragm 72 is relatively easy to deform and ensures that the motor oil inside chamber 54 is substantially equal to the fluid pressure outside chamber 55 in well 18.

By reducing the pressure differential between the interior chamber 55 of housing 54 and isolated stator 21 and shaft 23 of the motor, and the ambient environment outside of housing 53 and chamber 54, stresses on the seal assemblies and the likelihood of the motor leaking its internal oil or drawing in external contaminates through the seal assemblies in upper end cap 59, for example, due to high pressure differentials is reduced. The addition of pressure compensator 58 in actuator 20 helps to equalize the internal and external pressures, reducing the load on the motor and lessening the likelihood of loss of cooling oil or introduction of contaminates to chamber 54 and the internal components of the motor. Thus, pressure compensator 58 provides a sealed flexible bladder 72 which allows the pressure internal and external to the motor to equalize as the pressure differential changes.

Alternatively, a piston type pressure compensator may be used. It functions generally the same as the bladder type, with the exception that the barrier between the motor oil in sub-chamber 75 and the well fluid in chamber 76 is a piston, which is slidably disposed within the end of the cylindrical housing. As the motor oil is displaced in sub-chamber 75, the piston will move and displace well fluid in chamber 76 on the other side, and vice versa.

While the presently preferred form of the improved linear actuator for pumping has been shown and described, and several modifications thereof discussed, persons skilled in this art will readily appreciate that various additional changes and modifications may be made without departing from the scope of the invention, as defined and differentiated by the following claims.

What is claimed is:

1. An oil well installation, comprising: tubing arranged in a well and forming a flow channel to a surface level for well fluids originating from below said surface level; a pump disposed in said well; a linear actuator disposed in said well and configured to actuate said pump; said linear actuator comprising a stator having an inner opening and a shaft disposed in said opening and configured and arranged to reciprocate linearly in an axial direction relative to said stator under the effect of a magnetic field generated by said stator; a cable supplying electric power from said surface level to said stator; said shaft comprising a plurality of permanent magnets spaced linearly in said axial direction and having an inner passage extending axially through at least a portion of said shaft; said stator comprising: a first stator assembly comprising a plurality of pole sections spaced linearly in said axial direction and a plurality of coils disposed there between, said plurality of pole sections forming a first inner surface of said stator opening of a first diameter; a second stator assembly comprising a plurality of pole sections spaced linearly in said axial direction and a plurality of coils disposed there between, said plurality of pole sections forming a second inner surface of said stator opening of said first diameter; a bearing assembly positioned axially between said first stator assembly and said second stator assembly and forming a third inner surface of said stator opening, at least a portion of which has a second diameter less than said first diameter; said bearing assembly having a width that is a function of said spacing of said plurality of pole sections of said first stator assembly and said second stator assembly and said spacing of said plurality of permanent magnets of said shaft; an actuator housing and a seal defining a chamber substantially isolated from said well fluids; said stator and said shaft disposed in said chamber and said chamber being sealed by said actuator housing and said seal such that said inner passage of said shaft is substantially isolated from said well fluids; said chamber containing a liquid and said liquid substantially sealed within said chamber by said actuator housing and said seal; said shaft and said chamber configured and arranged such that said liquid will substantially flow through said inner passage of said shaft with linear movement of said shaft relative to said stator; and said seal comprising a pressure compensator configured and arranged to normalize pressure differences between outside said chamber and inside said chamber.

2. The oil well installation set forth in claim 1, wherein: said actuator housing comprises a first end portion and said linear actuator comprises an actuator rod having a portion sealingly penetrating said first end portion; and said pump comprises a pump housing connected to said actuator housing and a piston disposed in said pump housing and configured and arranged to reciprocate linearly in an axial direction relative to said pump housing; said piston connected to said portion of said actuator rod sealingly penetrating said first end portion for movement therewith.

3. The oil well installation set forth in claim 1, wherein said pressure compensator comprises a bladder in said chamber and a pressure port extending through an end cap and communicating between an interior of said bladder and outside of said actuator housing and said seal.

4. The oil well installation set forth in claim 1, wherein: said actuator housing comprises a first cylinder portion defining a first subchamber, a second cylinder portion defining a second subchamber, and a third cylinder portion defining a third subchamber; said stator is disposed in said second subchamber and is fixed to said second cylinder portion; and said shaft is configured and arranged to reciprocate linearly in a first axial direction into said first subchamber and to reciprocate linearly in a second axial direction into said third subchamber.

5. The oil well installation set forth in claim 4, wherein: said actuator housing comprises a first end portion at a first distal end of said first cylinder portion and said linear actuator comprises an actuator rod connected to a first distal end of said shaft for movement therewith and disposed in said first subchamber and having a portion sealingly penetrating said first end portion of said actuator housing; and said pump comprises a pump housing connected to said first cylinder portion of said actuator housing and a piston disposed in said pump housing and configured and arranged to reciprocate linearly in an axial direction relative to said pump housing; and said piston is connected to said portion of said actuator rod sealingly penetrating said first end portion of said actuator housing for movement therewith.

6. The oil well installation set forth in claim 5, comprising an annular seal element between said first end portion and said actuator rod.

7. The oil well installation set forth in claim 5, wherein said actuator rod and said first end of said shaft are connected by an alignment swivel coupling.

8. The oil well installation set forth in claim 5, wherein said first end of said shaft comprises at least one side passage extending through said shaft from said inner axial passage of said shaft to an outer surface of said shaft.

9. The oil well installation set forth in claim 1, wherein:

- said first stator assembly comprises a first side surface having an alignment pilot;
- said second stator assembly comprises a first side surface having an alignment pilot; and
- said bearing assembly comprises a first side surface having an alignment pilot in mating relationship with said alignment pilot of said first side surface of said first stator assembly and a second side surface having an alignment pilot in mating relationship with said alignment pilot of said first side surface of said second stator assembly.

10. The oil well installation set forth in claim 9, wherein each of said alignment pilots comprises an outer annular step.

11. The oil well installation set forth in claim 1, wherein said stator assembly comprises:

- a first end bearing assembly positioned axially outside said first stator assembly relative to said bearing assembly and forming a fourth inner surface of said stator opening, at least a portion of which has a diameter less than said first diameter; and
- a second end bearing assembly positioned axially outside said second stator assembly relative to said bearing assembly and forming a fifth inner surface of said stator opening, at least a portion of which has a diameter less than said first diameter.

12. The oil well installation set forth in claim 1, wherein said stator, said shaft and said chamber are configured and arranged such that said liquid will substantially flow in a clearance gap between an inner surface of said stator and an outer surface of said shaft with linear movement of said shaft relative to said stator.

13. The oil well installation set forth in claim 1, wherein said third inner surface of said stator opening formed by said bearing assembly comprises a frusto-conical tapered surface.

14. The oil well installation set forth in claim 13, wherein said frusto-conical tapered surface funnels said liquid to provide a higher pressure annular volume proximate said third inner surface of said stator opening formed by said bearing assembly.

15. A linear actuator for pumping, comprising: a stator having an inner opening; a shaft comprising a plurality of permanent magnets spaced linearly in an axial direction and having an inner passage extending axially through at least a portion of said shaft; said shaft disposed in said stator opening and configured and arranged to reciprocate linearly in an axial direction relative to said stator under the interaction of a magnetic field generated by said stator and said magnets; a housing and a seal defining a chamber substantially isolated from an environment outside said housing and said seal; said stator and said shaft disposed in said chamber and said chamber being sealed by said housing and said seal such that said inner passage of said shaft is substantially isolated from said environment outside said housing and said seal; said chamber containing a liquid and said liquid substantially sealed within said chamber by said housing and said seal; and said shaft and said chamber configured and arranged such that said liquid will substantially flow through said inner passage of said shaft with linear movement of said shaft relative to said stator.

16. The linear actuator set forth in claim 15, wherein:

- said housing comprises a first cylinder portion defining a first subchamber, a second cylinder portion connected to said first cylinder portion and defining a second subchamber, and a third cylinder portion connected to said second cylinder portion and defining a third subchamber;
- said stator is disposed in said second subchamber and is fixed to said second cylinder portion; and
- said shaft is configured and arranged to reciprocate linearly in a first axial direction into said first subchamber and to reciprocate linearly in a second axial direction into said third subchamber.

17. The linear actuator set forth in claim 16, wherein said seal comprises a first end portion at a first distal end of said first cylinder portion and said linear actuator comprises an actuator rod connected to a first distal end of said shaft for movement therewith and disposed in said first subchamber and having a portion sealingly penetrating said first end portion of said seal.

18. The linear actuator set forth in claim 17, wherein said actuator rod and said first end of said shaft are connected by an alignment swivel coupling.

19. The linear actuator set forth in claim 17, wherein said first end of said shaft comprises at least one side passage extending through said shaft from said inner axial passage of said shaft to an outer surface of said shaft.

20. The linear actuator set forth in claim 15, wherein said stator, said shaft and said chamber are configured and arranged such that said liquid will substantially flow in a clearance gap between said inner opening of said stator and an outer surface of said shaft with linear movement of said shaft relative to said stator.

21. The linear actuator set forth in claim 15, wherein said stator, said housing and said chamber are configured and arranged such that said liquid will substantially flow in a clearance gap between an inner surface of said housing and an outer surface of said stator with linear movement of said shaft relative to said stator.

22. A linear actuator for pumping, comprising: a stator having an inner opening; a shaft comprising a plurality of permanent magnets spaced linearly in an axial direction and having an inner passage extending axially through at least a portion of said shaft; said shaft disposed in said stator opening and configured and arranged to reciprocate linearly in an axial direction relative to said stator under the interaction of a magnetic field generated by said stator and said magnets; a housing and a seal defining a chamber substantially isolated from an environment outside said housing and said seal; said stator and said shaft disposed in said chamber and said chamber being sealed by said housing and said seal such that said inner passage of said shaft is substantially isolated from said environment outside said housing and said seal; said chamber containing a liquid and said liquid substantially sealed within said chamber by said housing and said seal; and said seal comprising a pressure compensator configured and arranged to normalize pressure differences between outside said chamber and inside said chamber.

23. The linear actuator set forth in claim 22, wherein said pressure compensator comprises a bladder in said chamber and a pressure port extending through a first end cap of said seal and communicating between an interior of said bladder and outside of said housing and said seal.

24. The linear actuator set forth in claim 22, wherein:

said housing comprises a first cylinder portion defining a first subchamber, a second cylinder portion defining a second subchamber, and a third cylinder portion defining a third subchamber;

said stator is disposed in said second subchamber and is fixed to said second cylinder portion;

said shaft is configured and arranged to reciprocate linearly in a first axial direction into said first subchamber and to reciprocate linearly in a second axial direction into said third subchamber; and said pressure compensator is disposed in said third subchamber.

25. The linear actuator set forth in claim 24, wherein said linear actuator comprises an actuator rod connected to a first distal end of said shaft for movement therewith and disposed in said first subchamber and having a portion sealingly penetrating a second end cap.

* * * * *